United States Patent [19]
Fielder

[11] Patent Number: 5,623,577
[45] Date of Patent: Apr. 22, 1997

[54] COMPUTATIONALLY EFFICIENT ADAPTIVE BIT ALLOCATION FOR ENCODING METHOD AND APPARATUS WITH ALLOWANCE FOR DECODER SPECTRAL DISTORTIONS

[75] Inventor: Louis D. Fielder, Millbrae, Calif.

[73] Assignee: Dolby Laboratories Licensing Corporation, San Francisco, Calif.

[21] Appl. No.: 190,655

[22] Filed: Jan. 28, 1994

Related U.S. Application Data

[63] Continuation-in-part of Ser. No. 145,975, Nov. 1, 1993, which is a continuation-in-part of Ser. No. 92,269, Jul. 16, 1993, abandoned.

[51] Int. Cl.[6] .................................................. G10L 9/00
[52] U.S. Cl. ................... 395/2.38; 395/2.3; 395/2.35; 395/2.39; 395/2.37
[58] Field of Search ................... 395/2, 2.1, 2.3–2.39; 381/36–40, 46, 47

[56] References Cited

U.S. PATENT DOCUMENTS

| | | | |
|---|---|---|---|
| 5,301,255 | 4/1994 | Nagai et al. | 395/2.38 |
| 5,475,789 | 12/1995 | Nishiguchi | 395/2.39 |

FOREIGN PATENT DOCUMENTS

| | | |
|---|---|---|
| 0376553 | 7/1990 | European Pat. Off. |
| 4177300 | 6/1992 | Japan |

OTHER PUBLICATIONS

Thomas W. Parsons, Voice and Speech Processing, McGraw–Hill, New York, NY, p. 9 1987.

Harris; "On the Use of Windows for Harmonic Analysis with the Discrete Fourier Transform," Proc. of IEEE, vol. 66, Jan. 1978, pp. 51–58, 81–83.

Schroeder, et al.; "Optimizing Digital Speech Coders by Exploiting Masking Properties of the Human Ear," *J. Acoust. Soc. Am.*, Dec. 1979, pp. 1647–1652.

Johnston; "Transform Coding of Audio Signals Using Perceptual Noise Criteria," *IEEE J. on Selected Areas in Comm.*, Feb. 1988, pp/ 314–323.

(List continued on next page.)

*Primary Examiner*—Allen R. MacDonald
*Assistant Examiner*—Michael A. Sartori
*Attorney, Agent, or Firm*—Thomas A. Gallagher; David N. Lathrop

[57] ABSTRACT

The invention relates in general to low bit-rate encoding and decoding of information such as audio information. More particularly, the invention relates to computationally efficient adaptive bit allocation and quantization of encoded information useful in high-quality low bit-rate coding systems.

In audio applications, a digital split-band encoder splits an input signal into frequency subband signals having bandwidths commensurate with the critical bandwidths of the human auditory system, quantizes the subband signals according to values established by an allocation function, and assembles the quantized subband signals into an encoded signal. The allocation function establishes allocation values in accordance with psychoacoustic principles with allowance for decoding synthesis filter bank spectral distortions.

In one embodiment, an allocation function establishes allocation values using a psychoacoustic masking threshold generated by estimating the power spectral density (PSD) of the input signal, generating an excitation pattern by applying a basilar-membrane spreading function to the PSD, adjusting the excitation pattern by an amount equal to a sensitivity function which specifies a signal-to-noise ratio (SNR) sufficient to achieve psychoacoustic masking, comparing the level of the adjusted pattern to the threshold of hearing and generating the psychoacoustic masking threshold which is equal to the larger of the two. An allocation function may allow for decoder synthesis filter bank spectral distortions in any of a number of ways such as by adapting the sensitivity function.

24 Claims, 15 Drawing Sheets

OTHER PUBLICATIONS

Mahieux, et al.; "Transform Coding of Audio Signals at 64 kBit/s," Proc. IEEE GLOBECOM, Dec. 1990, vol. 2, pp. 518–522.

"Coding of Moving Pictures and Associated Audio for Digital Storage Media at Up to About 1.5 Mbit/s," CD 11172-3, ISO/IEC JTCI/SC29, 1992, pp. 2, D–19 to D–24.

Kuusama, et al.; "Capacity and Properties of Slave Mode Hidden Channel Coding", *IEEE Int. Conf. Sys. Engr.*, Sep. 1992, pp. 467–472.

5,623,577

COMPUTATIONALLY EFFICIENT ADAPTIVE BIT ALLOCATION FOR ENCODING METHOD AND APPARATUS WITH ALLOWANCE FOR DECODER SPECTRAL DISTORTIONS

CROSS-REFERENCE INFORMATION

This application is a continuation-in-part of copending application Ser. No. 08/145,975 filed Nov. 1, 1993, which is a continuation-in-part of application Ser. No. 08/092,269 filed Jul. 16, 1993 now abandoned.

TECHNICAL FIELD

The invention relates in general to low bit-rate encoding and decoding of information such as audio information. More particularly, the invention relates to computationally efficient adaptive bit allocation and quantization of encoded information useful in high-quality low bit-rate coding systems with allowance for decoder spectral distortions.

BACKGROUND

There is considerable interest among those in the fields of audio- and video-signal processing to minimize the amount of information required to represent a signal without perceptible loss in signal quality. By reducing information requirements, signals impose lower information capacity requirements upon communication channels and storage media.

Analog signals which have been subject to compression or dynamic range reduction, for example, impose lower information capacity requirements than such signals without compression. Digital signals encoded with fewer binary bits impose lower information capacity requirements than coded signals using a greater number of bits to represent the signal. Of course, there are limits to the amount of reduction which can be realized without degrading the perceived signal quality. The following discussion is directed more particularly to digital techniques, but it should be realized that corresponding considerations apply to analog techniques as well.

The number of bits available for representing each sample of a digital signal establishes the accuracy of the digital signal representation. Lower bit rates mean that fewer bits are available to represent each sample; therefore, lower bit rates imply greater quantizing inaccuracies or quantizing errors. In many applications, quantizing errors are manifested as quantizing noise, and if the errors are of sufficient magnitude, the quantizing noise will degrade the subjective quality of the coded signal.

Various "split-band" coding techniques attempt to reduce information requirements without any perceptible degradation by exploiting various psycho-perceptual effects. In audio applications, for example, the human auditory system displays frequency-analysis properties resembling those of highly asymmetrical tuned filters having variable center frequencies and bandwidths that vary as a function of the center frequency. The ability of the human auditory system to detect distinct tones generally increases as the difference in frequency between the tones increases; however, the resolving ability of the human auditory system remains substantially constant for frequency differences less than the bandwidth of the above mentioned filters. Thus, the frequency-resolving ability of the human auditory system varies according to the bandwidth of these filters throughout the audio spectrum. The effective bandwidth of such an auditory filter is referred to as a "critical band." A dominant signal within a critical band is more likely to mask the audibility of other signals anywhere within that critical band than it is likely to mask other signals at frequencies outside that critical band. See generally, the *Audio Engineering Handbook*, K. Blair Benson ed., McGraw-Hill, San Francisco, 1988, pages 1.40–1.42 and 4.8–4.10.

Audio split-band coding techniques which divide the useful signal bandwidth into frequency bands with bandwidths approximating the critical bands of the human auditory system can better exploit psychoacoustic effects than wider band techniques. Such split-band coding techniques, in concept, generally comprise dividing the signal bandwidth with a filter bank, reducing the information requirements of the signal passed by each filter band to such an extent that signal degradation is just inaudible, and reconstructing a replica of the original signal with an inverse process. Two such techniques are subband coding and transform coding. Audio subband and transform coders can reduce information requirements in particular frequency bands where the resulting artifacts are psychoacoustically masked by one or more spectral components and, therefore, do not degrade the subjective quality of the encoded signal.

Subband coders may use any of various techniques to implement a filter bank with analog or digital filters. In digital subband coders, an input signal comprising signal samples is passed through a bank of digital filters. Each subband signal passed by a respective filter in the filter bank is downsampled according to the bandwidth of that subband's filter. The coder attempts to quantize each subband signal using just enough bits to render the quantizing noise imperceptible. Each subband signal comprises samples which represent a portion of the input signal spectrum.

Transform coders may use any of various so-called time-domain to frequency-domain transforms to implement a bank of digital filters. Individual coefficients obtained from the transform, or two or more adjacent coefficients grouped together, define "subbands" having effective bandwidths which are sums of individual transform coefficient bandwidths. The coefficients in a subband constitute a respective subband signal. The coder attempts to quantize the coefficients in each subband using just enough bits to render the quantizing noise imperceptible.

Throughout the following discussion, the term "split-band coder" shall refer to subband coders, transform coders, and other split-band coding techniques which operate upon portions of the useful signal bandwidth. The term "subband" shall refer to these portions of the useful signal bandwidth, whether implemented by a true subband coder, a transform coder, or other technique.

As discussed above, many digital split-band coders utilizing psycho-perceptual principles provide high-quality coding at low bit rates by applying a filter bank to an input signal to generate subband signals, generating quantized information by attempting to quantize the subband signals using a number of bits such that resulting quantizing noise is just imperceptible due to psycho-perceptual masking effects, and assembling the quantized information into a form suitable for transmission or storage.

A complementary digital split-band decoder recovers a replica of the original input signal by extracting quantized information from an encoded signal, dequantizing the quantized information to obtain subband signals, and applying an inverse or synthesis filter bank to the subband signals to generate the replica of the original input signal.

The number of bits allocated to quantize the subband signals must be available to the decoder to permit accurate dequantization. A "forward-adaptive" encoder uses an allocation function to establish allocation values and explicitly passes these allocation values as "side information" to a decoder. A "backward-adaptive" encoder establishes allocation values by applying an allocation function to selected information and passes the selected information in the encoded signal rather than explicitly passing the allocation values. A backward-adaptive decoder reestablishes the allocation values by applying an allocation function to the selected information which it extracts from the encoded signal.

In one embodiment of a backward-adaptive encoder/decoder system, an encoder prepares an estimate of the input signal spectral envelope, establishes allocation values by applying an allocation function to the envelope estimate, scales signal information using elements of the envelope estimate as scale factors, quantizes the scaled signal information according to the established allocation values, and assembles the quantized information and the envelope estimate into an encoded signal. A backward-adaptive decoder extracts the envelope estimate and quantized information from the encoded signal, establishes allocation values by applying an allocation function to the envelope estimate, dequantizes the quantized information, and reverses the scaling of the signal information. Scaling is used to increase the dynamic range of information which can be represented by the limited number of bits available for quantizing. Two examples of a backward-adaptive audio encoder/decoder system are disclosed in U.S. Pat. Nos. 4,790,016 and 5,109,417, which are incorporated herein by reference in their entirety.

Backward-adaptive techniques are attractive in many low bit-rate coding systems because no bits are required to pass explicit allocation values. The decoder recreates the allocation values by applying an allocation function to information extracted from the encoded signal. A backward-adaptive decoder must use an allocation function which is identical, or at least exactly equivalent, to that utilized by the encoder, otherwise accurate dequantization in the decoder is not guaranteed. As a result, the complexity or implementation cost of the decoder is similar to that of the encoder. Any restriction upon decoder complexity usually imposes restrictions upon the complexity of the allocation function in both the encoder and decoder, thereby limiting overall performance of the encoder/decoder system.

Generally speaking, it is desirable to use allocation functions based upon perceptual models which are as sophisticated as can be implemented practically. This is because complex allocation functions based upon sophisticated psycho-perceptual models are usually able to establish allocation values which achieve equivalent subjective coding quality at lower bit rates than the allocation values established by less complex allocation functions based upon simpler models. In addition to using better perceptual models, an allocation function can further improve coding performance by making proper allowance for spectral distortions introduced by the decoding process. These distortions generally arise from synthesis filter bank imperfections. Because of practical considerations for the decoder, however, many backward-adaptive coding systems cannot utilize allocation functions based upon such computationally intensive models.

Forward-adaptive techniques are attractive in many high-quality coding systems because overall system performance is not constrained by restrictions to allocation function complexity in the decoder; the decoder does not need to perform an allocation function to establish allocation values. A forward-adaptive decoder can be computationally less complex and need not impose any restrictions upon the allocation function performed by the encoder. In addition, improved allocation functions may be incorporated into the encoders of forward-adaptive coding systems while maintaining compatibility with existing decoders. The allocation function used in an encoder can be the result of an independent design choice.

The ability to improve the allocation function in an encoder is significant. As advances are made in the arts of signal coding and signal processing, increasingly sophisticated allocation functions become economically practical. By increasing the sophistication of allocation functions, bit rates may be decreased for a given signal quality, or signal quality may be increased for a given bit rate.

Despite these advantages, however, forward-adaptive coding systems are unsuitable for many low bit-rate applications because they require a significant number of bits to convey side information. Generally, even more bits are required to convey side information as allocation functions seek to improve coding performance by dividing the spectrum into narrower, and therefore more numerous, subbands. Furthermore, the number of bits required to carry this side information will represent a larger proportion of the coded signal as improved coding techniques decrease the number of bits required to carry the remainder of the coded signal.

There is, therefore, a desire to develop efficient allocation functions based upon more sophisticated perceptual models which are suitable for low-cost implementation of coding systems, and which properly allow for spectral distortions produced by the decoding process.

One fairly sophisticated psychoacoustic model based upon the mechanics of human hearing is described by Schroeder, Atal and Hall, "Optimizing Digital Speech Coders by Exploiting Masking Properties of the Human Ear," *J. Acoust. Soc. Am.*, December 1979, pp. 1647–1652. The model comprises (1) performing a short-time spectral analysis of an input signal by applying a short-time Fourier transform, (2) obtaining the input signal critical-band densities by mapping the resulting spectral coefficients into critical bands x, and (3) generating a basilar-membrane "excitation pattern" by convolving the critical band densities with a basilar membrane "spreading function." This model is applied to the input signal and to a noise signal representing quantizing errors to generate a "signal excitation pattern" and a "noise excitation pattern," respectively. The loudness of the input signal and the noise signal are calculated by integrating functions of the respective excitation patterns. The loudness of the input signal and the noise signal whose excitation pattern falls below a masking threshold is zero; that is, it is inaudible. The masking function is obtained from the product of the signal excitation pattern and a "sensitivity function" which defines the threshold of masking. An objective measure of coding performance is a ratio obtained by dividing the loudness of the noise signal by the loudness of the input signal. The model is straightforward and provides reasonably good results for spectral energy below about 5 kHz, but it is computationally intensive and makes no allowance for decoder spectral distortions.

DISCLOSURE OF INVENTION

It is an object of the present invention to provide an efficient, high-performance allocation function suitable for use in low bit-rate high-quality encoding/decoding systems which also provides for proper allowance of decoder spectral distortions.

According to the teachings of one aspect of the present invention, an encoder splits an input signal into a plurality of subbands x to generate subband signals, quantizes the subband signals according to allocation values established by an allocation function, and assembles the quantized information into an encoded representation of the input signal. The allocation function establishes allocation values in accordance with psycho-perceptual principles and in accordance with decoder spectral distortion characteristics. The decoder distortion model enables the allocation function to allow for subsequent spectral distortions produced by the decoder.

In a first embodiment, an allocation function allows for decoder distortion by (a) establishing a quantizing noise spectrum $Q(x)$ resulting from the quantization of subband signals, Co) estimating decoded signal noise $N(x)$ by convolving $Q(x)$ with decoder filter bank frequency response $D(x)$; (c) establishing the perceptibility of $N(x)$ by comparing $N(x)$ with an established masking threshold $M(x)$; (d) establishing whether $N(x)$ is either imperceptible or substantially minimized in all subbands x; (e) terminating the process if so; otherwise (f) for each subband x in which $N(x)$ exceeds $M(x)$, identifying the largest $Q(x)$ components contributing to $N(x)$ in that subband and increasing the allocation values $A(x)$ corresponding to those $Q(x)$ components; (g) reiterating the foregoing steps.

In a second embodiment for an audio coding system, an allocation function allows for decoder spectral distortion only in subbands of the quantizing noise spectrum in which a respective subband decoder filter response rolls off at a rate substantially equal to or less than the rate at which the established masking threshold rolls off. In one implementation of this second embodiment, the allocation function decreases the established masking threshold $M(x)$ in those subbands below about 3 kHz in which $M(x)$ rolls off in a downward-frequency direction more rapidly than the lower-frequency roll off of the decoder filter bank response. The amount by which $M(x)$ is decreased in those subbands depends upon the number of subbands across which the threshold decreases more rapidly than the filter response roll off. The decrease in the masking threshold $M(x)$ causes the allocation function to allocate additional bits to quantize the subband signals in those respective subbands, thereby reducing the expected audibility of the quantizing noise in those subbands.

The way in which the allocation function establishes the masking threshold can significantly affect coding system performance, but no particular way is critical in concept to the practice of the present invention. In preferred embodiments of audio coding systems, the masking threshold is established by estimating the power spectral density (PSD) of the input signal, generating an excitation pattern by applying a spreading function to the PSD, adjusting the excitation pattern by an amount equal to a frequency dependent signal-to-noise ratio (SNR) offset sufficient to achieve psychoacoustic masking, comparing the level of the adjusted pattern to the threshold of hearing and generating a masking threshold which is equal to the larger of the two.

In backward-adaptive coding systems, the PSD is estimated from information which is also assembled into the encoded signal. For example, the PSD can be estimated from scaling factors derived from a spectral envelope. In forward-adaptive coding systems, the PSD may be estimated from information which is and/or is not assembled into the encoded signal. For example, the PSD can be estimated from a high-resolution spectral envelope of the input signal even though the high-resolution envelope is not included in the encoded signal.

In preferred embodiments, an excitation pattern is generated by applying one or more filters to subband signals in the frequency domain. These filters may be implemented by recursive or Infinite Impulse Response (IIR) techniques, or by non-recursive or Finite Impulse Response (FIR) techniques. The use of either technique is not critical to the practice of the present invention.

In a third embodiment, an encoder modifies one or more parameters affecting the results of the allocation function in response to characteristics detected in either the input signal and/or the subband signals. For example, the SNR offset mentioned above can be modified to affect overall coding quality. Side information comprising an indication of the modified parameters is assembled into the encoded signal.

In an implementation of the third embodiment, modified allocation values resulting from the use of modified parameters are assembled into the encoded signal as explicit allocation values.

Further embodiments of an encoder according to the teachings of the present invention are possible, including, but not limited to, an embodiment which incorporates a combination of the embodiments described above. Furthermore, various combinations of the particular implementations described above are possible.

In a first embodiment of an audio decoder, quantized information is extracted from an encoded signal, the quantized information is dequantized according to allocation values established by an allocation function, and an output signal is generated in response to the dequantized information. The allocation function establishes allocation values in accordance with psychoacoustic principles based upon a masking threshold. The masking threshold is established by obtaining an estimate of the PSD of the original input signal represented by the encoded signal, generating an excitation pattern by applying a spreading function to the PSD, adjusting the excitation pattern by an amount equal to a SNR offset sufficient to achieve psychoacoustic masking, comparing the level of the adjusted pattern to the threshold of hearing and generating a masking threshold which is equal to the larger of the two.

In backward-adaptive coding systems, the PSD may be estimated from measures of subband signal amplitude and/or power which are extracted from the encoded signal. In forward-adaptive coding systems, however, decoders generally do not use any allocation function because explicit allocation values are passed in the encoded signal.

In a second embodiment of a decoder, one or more parameters affecting the results of the allocation function are extracted from the encoded signal. In another implementation, explicit allocation values representing modified allocation values are extracted from the encoded signal.

Further embodiments of a decoder according to the teachings of the present invention are possible, including, but not limited to, an embodiment which incorporates a combination of the embodiments described above. Furthermore, various combinations of the particular implementations described above are possible.

In a coding system using hybrid-adaptive allocation, side information may convey only modified allocation values and/or modified parameters. An allocation function known to both the encoder and the decoder provides basic allocation values to the decoder. Side information provides adjustments to the basic allocation values as necessary to obtain the same allocation values used in the encoder. In this way, the allocation function in an encoder may be changed without losing compatibility with existing decoders, and the number of bits required for side information to maintain compatibility between encoder and decoder is reduced.

The present invention may be used in split-band coders with filter banks implemented by any of several techniques. In audio coding applications, for example, it should be understood that the use of subbands with bandwidths commensurate with human auditory system critical bandwidths allows greater exploitation of psychoacoustic effects, but various aspects of the present invention are not so limited. Therefore, the term "subband" and the like as used herein should be understood as referring to one or more frequency bands within the useful bandwidth of an input signal.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention. For example, this discussion is directed more particularly to audio coding applications, but the present invention may be practiced in a wider range of psycho-perceptual coding applications such as video coding.

BRIEF DESCRIPTION OF THE INVENTION

FIG. 11b is a hypothetical graphical illustration of the composite impulse response of an embodiment similar to that shown in FIG. 8 but comprising only two filters, in which one of the filters has the impulse response shown in FIG. 11a.

MODES FOR CARRYING OUT THE INVENTION

Forward-Adaptive Allocation

Figure 1:
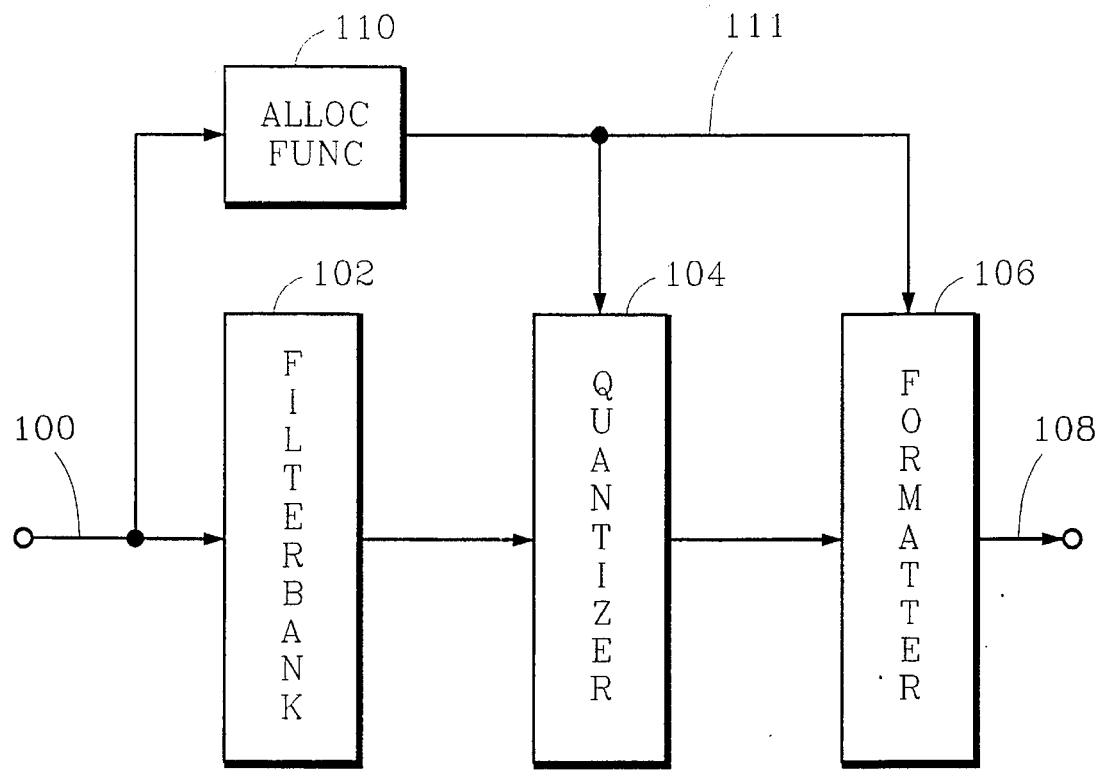
FIG. 1 is a block diagram illustrating one embodiment of an encoder in an encoder/decoder system incorporating forward-adaptive allocation.

FIG. 1 illustrates the basic structure of one embodiment of a split-band encoder used in an encoder/decoder system incorporating forward-adaptive allocation. Filterbank 102 generates subband signals in response to an input signal received from path 100. Allocation function 110 establishes allocation values in response to the input signal and passes the allocation values along path 111 to quantizer 104 and formatter 106. Quantizer 104 generates quantized information by quantizing the subband signals received from filterbank 102 using a quantization function adapted in response to the allocation values, and formatter 106 assembles the quantized information and the allocation values into an encoded signal having a format suitable for transmission or storage. The encoded signal is passed along path 108 to a transmission channel or storage device as desired.

Figure 2:
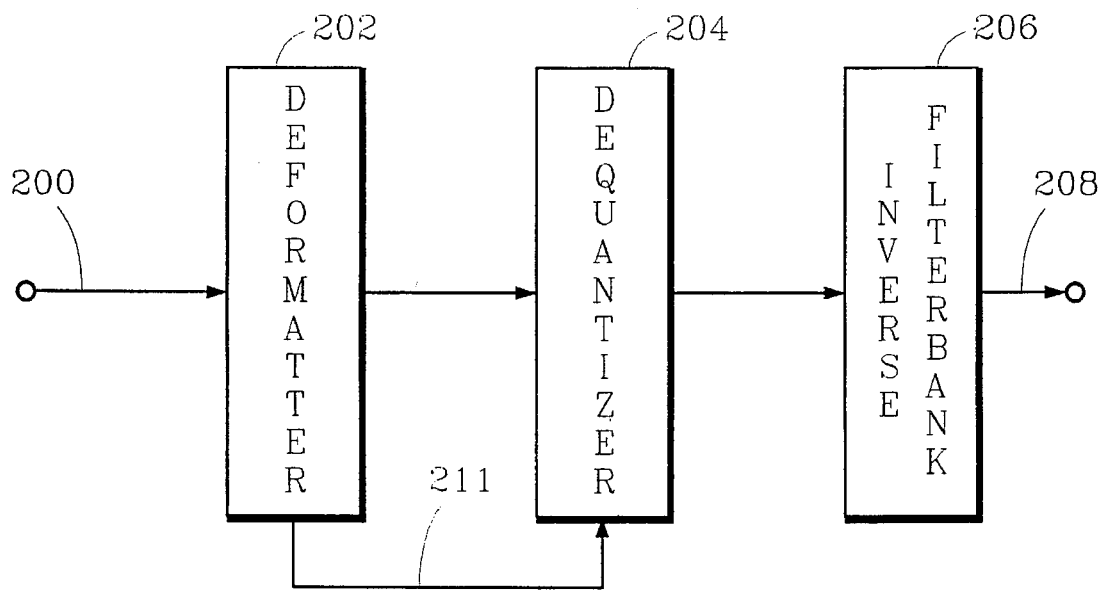
FIG. 2 is a block diagram illustrating one embodiment of a decoder in an encoder/decoder system incorporating forward-adaptive allocation.

FIG. 2 illustrates the basic structure of one embodiment of a split-band decoder used in an encoder/decoder system incorporating forward-adaptive allocation. Deformatter 202 extracts quantized information and allocation values from an encoded signal received from path 200. The allocation values are passed along path 211 and to dequantizer 204. Dequantizer 204 generates subband signals by dequantizing the quantized information received from deformatter 202 using a dequantization function adapted in response to the allocation values. Inverse filterbank 206 generates along path 208 an output signal in response to the subband signals received from dequantizer 204.

Figure 3:
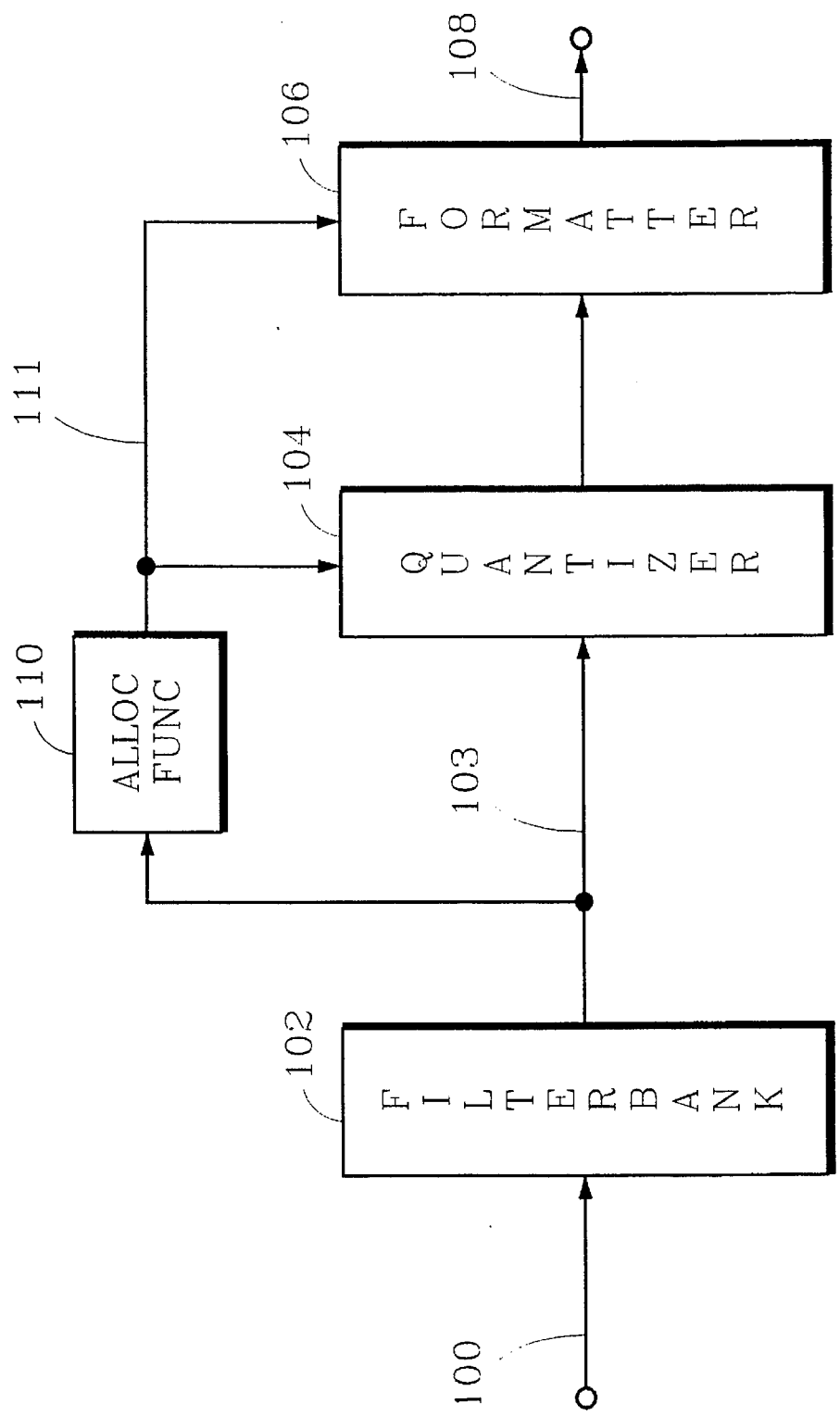
FIG. 3 is a block diagram illustrating another embodiment of an encoder in an encoder/decoder system incorporating forward-adaptive allocation.

Alternate embodiments of the encoder and decoder are possible. For example, as shown in FIG. 3, a forward-adaptive encoder may establish allocation values in response to the subband signals generated by filterbank 102. In yet another embodiment not shown in any figure, allocation values may be established in response to both the input signal and the subband signals.

As discussed above, because allocation values are explicitly passed in the encoded signal, the allocation function in a forward-adaptive encoder may be changed without sacrificing compatibility with existing forward-adaptive decoders. Only the format of the encoded signal must be preserved.

Backward-Adaptive Allocation

Figure 4:
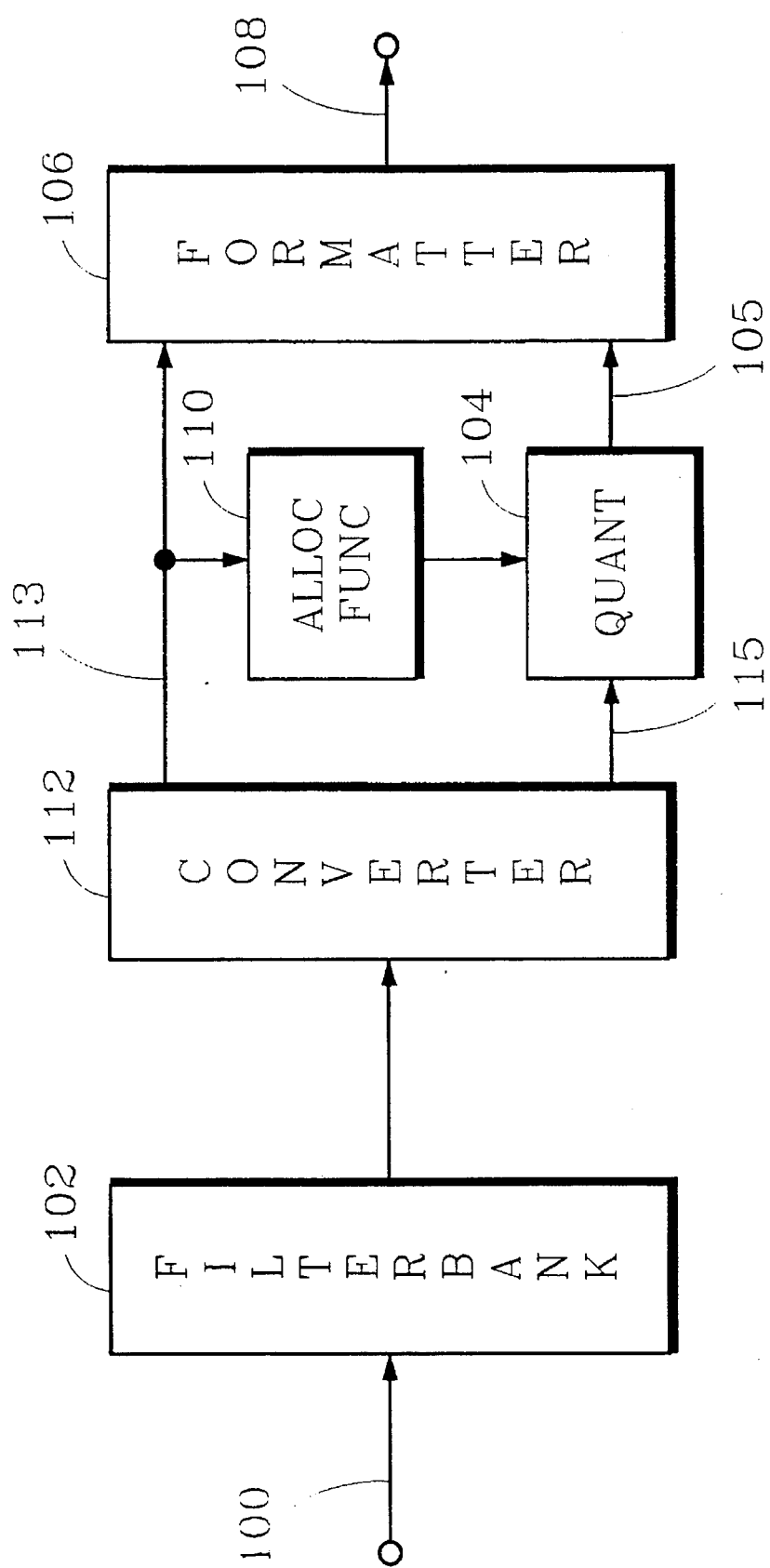
FIG. 4 is a block diagram illustrating one embodiment of an encoder in an encoder/decoder system incorporating backward-adaptive allocation.

FIG. 4 illustrates the basic structure of one embodiment of a split-band encoder used in an encoder/decoder system incorporating backward-adaptive allocation. Filterbank 102 generates subband signals in response to an input signal received from path 100. Converter 112 generates a representation of the subband signals comprising X words and Y words. The X words are passed along path 113 as input to allocation function 110 and to formatter 106. Allocation function 110 establishes allocation values in response to the X words and passes the allocation values to quantizer 104. Quantizer 104 generates quantized information by quantizing the Y words received from path 115 using a quantization function adapted in response to the allocation values, and formatter 106 assembles the quantized information and the X words into an encoded signal having a format suitable for transmission or storage. The encoded signal is passed along path 108 to a transmission channel or storage device as desired.

Figure 5:
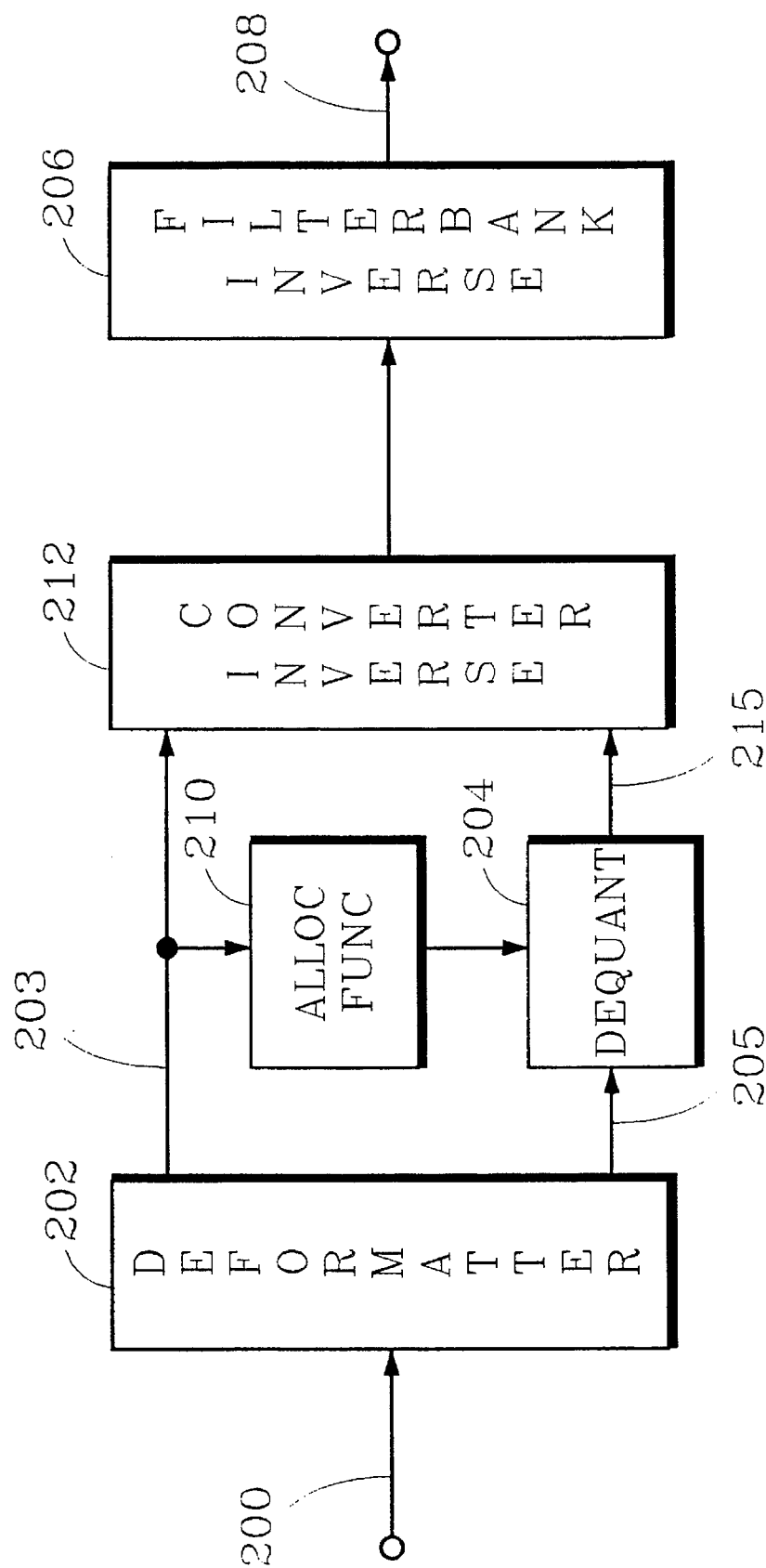
FIG. 5 is a block diagram illustrating one embodiment of a decoder in an encoder/decoder system incorporating backward-adaptive allocation.

FIG. 5 illustrates the basic structure of one embodiment of a split-band decoder used in an encoder/decoder system incorporating backward-adaptive allocation. Deformatter 202 extracts quantized information and X words from an encoded signal received from path 200. The X words are passed along path 203 to allocation function 210. Allocation function 210 establishes allocation values in response to the X words and passes the allocation values to dequantizer 204. Dequantizer 204 generates Ŷ words by dequantizing the quantized information received from deformatter 202 using a dequantization function adapted in response to the allocation values. Inverse converter 212 generates subband signals in response to the X words and the Ŷ words, and inverse filterbank 206 generates along path 208 an output signal in response to the subband signals received from inverse converter 212.

Backward-adaptive coding systems may avoid the overhead required to convey side information in the encoded signal because the allocation values are represented implicitly by the X words assembled into the encoded signal. A backward-adaptive decoder can recover the allocation values from the X words by performing an allocation function which is equivalent to that previously performed in a backward-adaptive encoder. It should be understood that accurate decoding of the encoded signal does not require that the encoder and decoder allocation functions themselves be identical, but accurate decoding can be ensured only if the two functions obtain identical allocation values.

Hybrid-Adaptive Allocation

Figure 6:
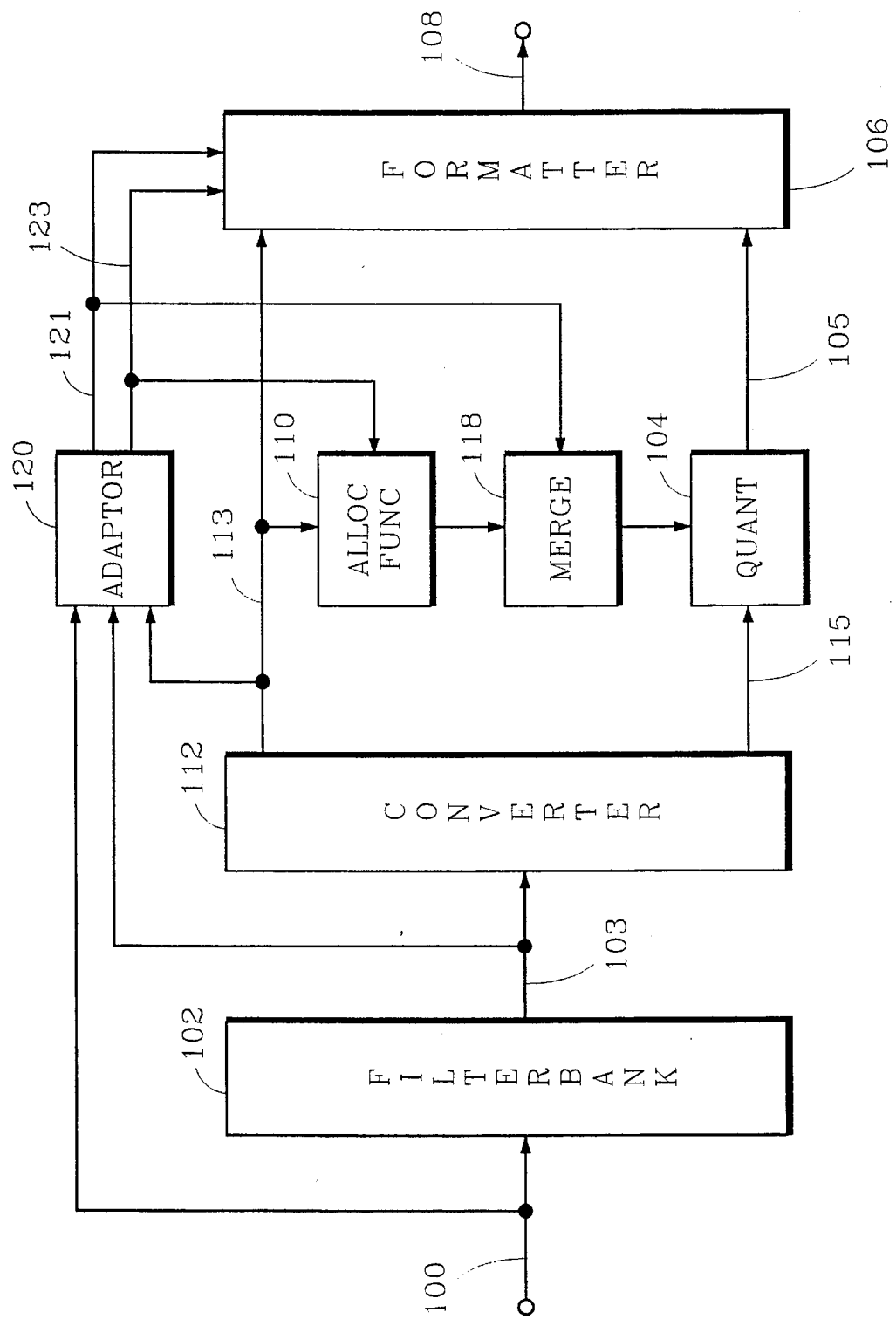
FIG. 6 is a block diagram illustrating one embodiment of an encoder in an encoder/decoder system incorporating hybrid-adaptive allocation.

FIG. 6 illustrates the basic structure of one embodiment of a split-band encoder used in an encoder/decoder system incorporating hybrid-adaptive allocation. The functions of the various elements within the embodiment shown in FIG. 4, discussed above, correspond to the functions of respective elements in the structure shown in FIG. 6. In addition, adaptor 120 modifies one or more of the allocation values established by allocation function 110 using either one or both of two basic techniques. The structure used to implement both techniques is illustrated in FIG. 6; however, either technique may be used alone and unnecessary functional elements may be removed from the illustrated structure.

In the first or "parameter" technique, adaptor 120 modifies one or more parameters which affect the results of allocation function 110. The modified parameters provided by adaptor 120 are passed along path 123 to allocation function 110 and to formatter 106. Formatter 106 assembles an indication of the modified parameters and the quantized information into an encoded signal having a format suitable for transmission or storage.

In the second or "value" technique, adaptor 120 modifies one or more allocation values. The modified values provided by adaptor 120 are passed along path 121 to formatter 106 and merge 118. Merge 118 merges the modified values with the allocation values received from allocation function 110 and passes the merged allocation values to quantizer 104. Formatter 106 assembles an indication of the modified values and the quantized information into an encoded signal having a format suitable for transmission or storage.

The embodiment illustrated in FIG. 6 shows adaptor 120 being responsive to the input signal received from path 100, the subband signals received from path 103, and the X words received from path 113. In alternate embodiments of a hybrid-adaptive encoder, adaptor 120 may be responsive to any one of the three paths, responsive to any combination of the three paths, and/or responsive to other information.

Figure 7:
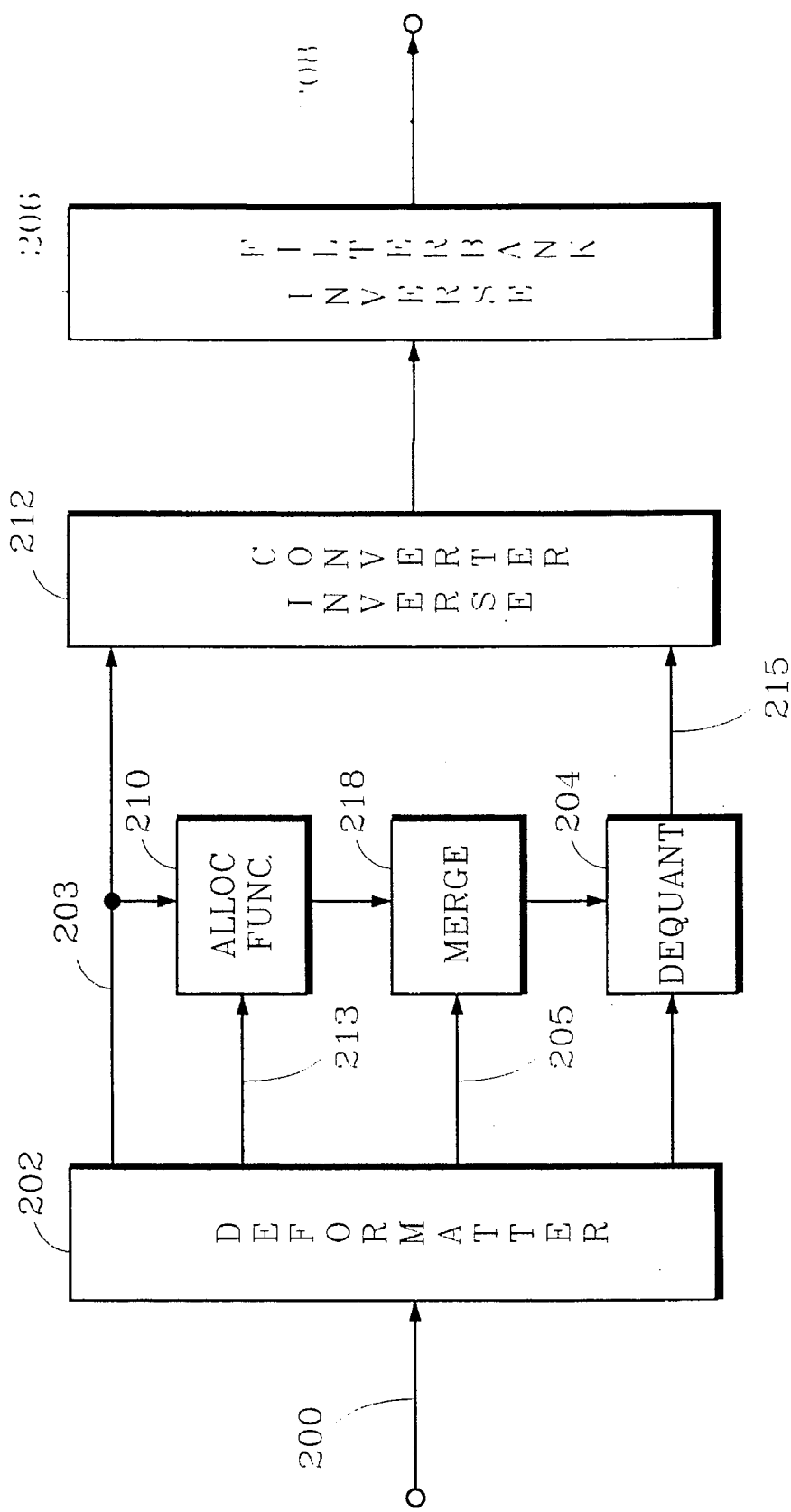
FIG. 7 is a block diagram illustrating one embodiment of a decoder in an encoder/decoder system incorporating hybrid-adaptive allocation.

FIG. 7 illustrates the basic structure of one embodiment of a split-band decoder used in an encoder/decoder system incorporating hybrid-adaptive allocation. The functions of the various elements within the embodiment shown in FIG. 5, discussed above, correspond to the functions of respective elements in the structure shown in FIG. 7. In addition, one or more of the allocation values are modified using either one or both of two basic techniques. The structure used to implement both techniques is illustrated in FIG. 7; however, either technique may be used alone and unnecessary functional elements may be removed from the illustrated structure.

In the first or "parameter" technique, deformatter 202 extracts from the encoded signal one or more modified parameters which affect the results of allocation function 210, and passes the modified parameters along path 213 to allocation function 210.

In the second or "value" technique, deformatter 202 extracts one or more modified values from the encoded signal and passes the modified values along path 205 to merge 218. Merge 218 merges the modified values with the allocation values received from allocation function 210, and passes the merged allocation values to dequantizer 204.

Implementation

The various block diagrams referred to below illustrate basic functional structures of encoders and decoders. The functions discussed below may be implemented in hardware, in software, or in a combination of the two.

Filter bank

The embodiments illustrated in FIGS. 1–7 may be realized by a wide variety of implementations. Filterbank 102 and inverse filterbank 206, for example, may be implemented by a variety of digital filtering techniques known in the art including, but not limited to, Quadrature Mirror Filters (QMF), polyphase filters and various Fourier transforms. A preferred embodiment uses the Time Domain Aliasing Cancellation (TDAC) transform disclosed in Princen, Johnson and Bradley, "Subband/Transform Coding Using Filter Bank Designs Based on Time Domain Aliasing Cancellation," *Proceedings Int. Conf. Acoust., Speech, and Signal Proc.*, May 1987, pp. 2161–2164. An example of a transform encoder/decoder system implementing a filter bank with the TDAC transform is described in U.S. Pat. 5,109,417, referred to above.

No particular implementation is critical to the practice of the present invention. Although the description herein of the present invention is more particularly directed toward digital split-band coding implementations, it should be understood that an encoder/decoder system incorporating aspects of the present invention may use analog filter banks as well. For example, filterbank 102 may comprise one or more analog filters and an analog-to-digital converter (ADC) which generates digital samples for each subband signal. Inverse filterbank 206 may comprise a digital-to-analog converter (DAC) which generates analog subband signals in response to digital samples and a component which combines the analog subband signals into a composite analog output signal.

Converter

Converter 112 and inverse converter 212 which generate and recover the X words and Y words may also be realized by a wide variety implementations. As discussed above, the X words are characterized by the fact that they are available to both encoder and decoder to inform the allocation function. The X words may, in general, correspond to scale factors and the Y words may correspond to values scaled in accordance with the scale factors. In embodiments utilizing various floating-point representations of numerical quantities, the X words may correspond to the floating-point exponents and the Y words may correspond to the floating-point mantissas.

In some implementations, groups or blocks of Y words are associated with a common X word exponent, forming a block-floating-point (BFP) representation. In a preferred embodiment, however, a higher-resolution spectral envelope is obtained from the X words by associating each Y word mantissa with one respective X word exponent.

Quantizer

The particular functions used by quantizer 104 and dequantizer 204 are not critical to the practice of the present invention, but the two functions should be complementary. In general, given the same allocation values, dequantization function d(x) is the inverse of quantization function q(x) such that the original quantity $x \approx d[q(x)]$. Strict equality is not expected because quantization usually results in the loss of some accuracy.

In response to the allocation values, quantizer 104 may adapt its quantization function in any of several ways. For example, quantizer 104 may set the number of quantizing levels according to the allocation values. An eight-level quantization function and a four-level quantization function could be used in response to values indicating an allocation of three bits and two bits, respectively. As another example, quantizer 104 could use a logarithmic quantization functions in response to allocation values greater than or equal to a specified level, say six bits, and use linear quantization functions in response to smaller values.

Quantizer 104 may also adapt its quantization function by switching between symmetric and asymmetric functions, or by adaptively using one or more quantizing levels to represent special ranges of amplitude. For example, U.S. patent application Ser. No. 07/981,286, incorporated herein by reference in its entirety, discloses an N-bit quantization function that uses one of its $2^N$ quantizing levels which would normally represent large amplitudes to instead represent very small amplitudes. By using such a quantization function, an encoder can allow a decoder to easily distinguish between small amplitudes, which are quantized to a value of zero, from very small amplitudes, which are quantized to the special quantizing level.

In response to the allocation values, dequantizer 204 adapts its dequantization function in a manner which is complementary to the manner in which quantizer 104 adapts its quantization function.

Merge

The methods used by merge 118 and merge 218 are not critical to the practice of the present invention. In concept, merge 118 and merge 219 combine into one set of values the corresponding values from a set of allocation values and a set of modified values. This may be done in a variety of ways. For example, an allocation value may be replaced by a corresponding modified value. In a split-band encoder, each allocation value represents the number bits to use to quantize a subband signal in a respective subband. Each modified value supersedes the corresponding allocation value and is used by the quantizer instead.

As another example, the two sets of values may be combined by using the modified values to adjust corresponding allocation values. For example, the modified value can represent an incremental amount by which the corresponding allocation value should be changed. In a split-band encoder, the number of bits used to quantize the subband signal in a particular subband could be defined by the algebraic sum of the respective allocation value and the corresponding modified value, if the modified value is present in the encoded signal. Alternatively, the modified value may represent a factor by which the corresponding allocation value should be scaled.

Formatter

In many coding systems where the encoded signal is represented by a serial bit stream, the functions provided by formatter 108 and deformatter 202 substantially correspond to serial-bit-stream multiplexing and demultiplexing, respectively. Although the implementation of the formatting and deformatting functions may be important to a particular application, it is not critical to the practice of the present invention. Any process is suitable which can put the encoded signal into a form suitable for transmission or storage, and can recover the encoded signal from the formatted representation.

Allocation Function

Overview

Allocation 110 establishes allocation values such that, if possible, the resulting quantizing noise in the decoded signal does not exceed a masking threshold. Although the discussion herein is directed more particularly to audio coding systems, the concepts presented may be used in a wider range of applications such as video coding. In video coding applications, for example, these concepts may be applied to a psycho-visual model which establishes a masking threshold in response to a variety of characteristics such as the apparent hue, saturation, brightness and size of a visual stimuli, corresponding characteristics of other stimuli within the field of view, and the nature of other stimuli viewed prior to the present ones.

Figure 9:
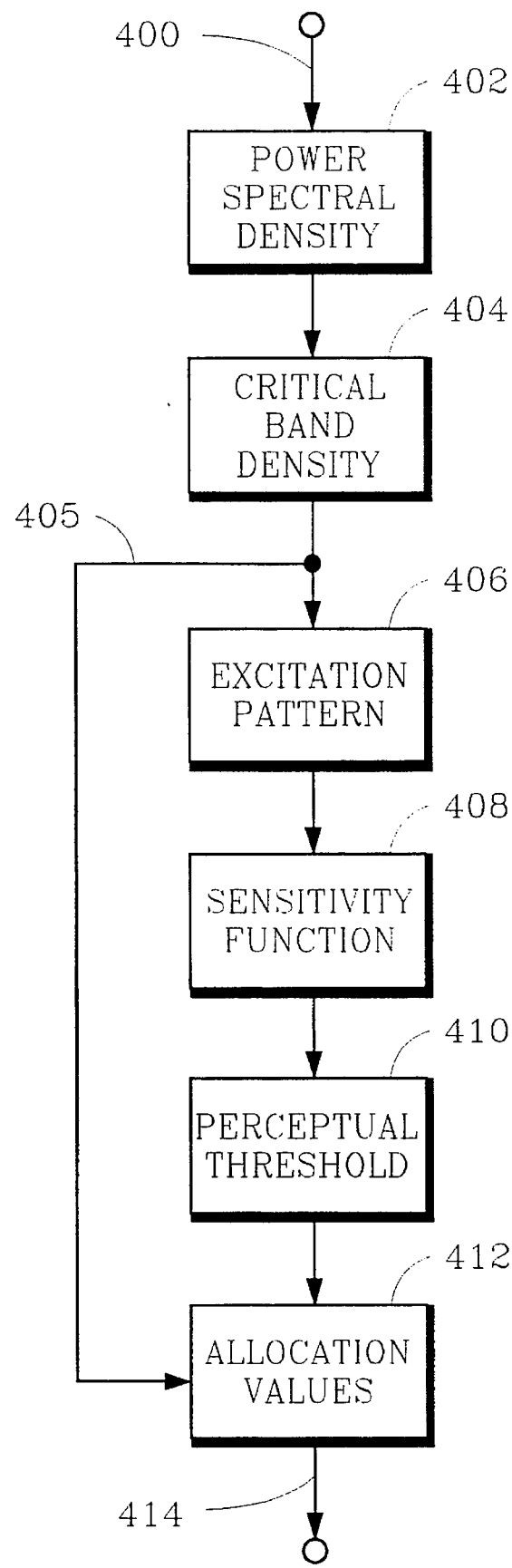
FIG. 9 is a block diagram illustrating one embodiment of an allocation function which implements a particular psycho-perceptual model.

The masking threshold is established by applying a model of human perception. A wide variety of models may be used. FIG. 9 is a block diagram illustrating one embodiment comprising several steps which implement a psychoacoustic model similar to that described by Schroeder, et al., cited above. In this embodiment, power spectral density 402 estimates the power spectral density (PSD) of an input signal received from path 400, critical band density 404 obtains the critical-band density of the input signal by mapping the PSD into critical bands, excitation pattern 406 generates a basilar-membrane excitation pattern by applying a basilar-membrane spreading function to the critical-band density information, sensitivity function 408 generates an interim masking threshold by adjusting the excitation pattern by an amount equal to a signal-to-noise ratio (SNR) offset sufficient to achieve psychoacoustic masking, perceptual threshold 410 generates a masking threshold which is equal to the larger of the interim masking threshold and a threshold of human audibility and allocation values 412 establishes allocation values in response to the audibility threshold and critical-band density information received from path 405 and passes them along path 414.

Some of these steps illustrated in FIG. 9 may be combined or performed in a different order. For example, power spectral density 402 and critical band density 404 can be reversed somewhat by first mapping the spectral components of an input signal into critical bands and then generating the critical-band density by estimating the power spectral density of the mapped components. As another example, step 404 through step 408 can be combined into a single step to generate an interim masking threshold by applying an appropriate spreading function directly to the input signal PSD.

The following discussion is more particularly directed toward embodiments incorporating variations of the steps listed above and shown in FIG. 9. A discussion of these steps is used to explain various concepts but the steps themselves are not required to practice the present invention. Various embodiments may incorporate other perceptual models which comprise different steps.

The concepts underlying an allocation function based upon only a perceptual model are discussed first. Because of coding system spectral distortions, however, the allocation values established by allocation functions based upon only perceptual models are not always correct. Following the initial discussion of allocation functions, the nature of coding system spectral distortions and some ways in which allowances for such distortions can be made are described.

Power Spectral Density

Encoders in forward-adaptive systems such as those shown in FIGS. 1 and 3 may estimate the PSD of an input signal from information received from path 100 and/or path 103. For example, in systems incorporating filter banks implemented by a Fast Fourier Transform (FFT), the PSD may be obtained from the square of the magnitude of each of the resulting transform coefficients. Encoders in backward-adaptive systems such as that shown in FIG. 4, however, generally estimate the PSD from the X words received from path 113.

In one implementation in which the amplitude of each spectral component C is represented in a conventional binary floating-point form comprising an exponent X and a mantissa Y, the power of the spectral components in dB may be estimated directly from the values of the exponents. The value of each exponent is the power of two used to normalized the associated mantissa, or $C=Y \cdot 2^{-X}$. From this representation, the power of each spectral component may be estimated from an expression such as $$\hat{S}_i \approx -6(X_i + 0.5) \text{dB}. \tag{1}$$

where $\hat{S}_i$=power of spectral component $C_i$, and $X_i$=value of the floating-point exponent for spectral component $C_i$.

In a preferred embodiment, each spectral component C is represented in floating-point form comprising a normalized mantissa Y and an exponent X. The PSD is estimated by grouping one or more spectral components into bands and obtaining the "log sum" of the exponents for the spectral components in each band. One way in which a log sum may be calculated is discussed below.

Conceptually, no particular method for estimating the PSD is critical to the practice of the present invention. As a practical matter, however, the accuracy of the method can significantly affect coding system performance.

Critical-Band Density

Split-band coding systems are generally more able to exploit psychoacoustic effects by dividing the input signal into subbands having bandwidths no more than one-half the critical bandwidths. This is usually necessary because coding system subbands have fixed center frequencies unlike the human auditory system critical bands which have variable center frequencies. It is sometimes incorrectly assumed that a dominant spectral component will mask other low-level spectral components throughout a split-band coder subband having a critical bandwidth. This assumption may not be true because the masking effects of a dominant spectral component diminish, outside the frequency interval of one-half a critical bandwidth on each side of the spectral component. If this dominant spectral component occurs at the edge of a coding system subband, other spectral components in the subband can occur outside the actual critical bandwidth unless the subband bandwidth is no more that one-half a critical bandwidth.

In one embodiment, the input signal PSD is mapped into bands each having a bandwidth of about one critical bandwidth of the human auditory system. Each of the bands has a width of one Bark. In a preferred embodiment, the input signal PSD is mapped into "subcritical bands" having bandwidths of about one-half the critical bandwidths of the human auditory system, or widths of approximately one-half Bark. This preferred mapping is represented by the entries shown in Table I.

Alternate mapping functions and bandwidths may be used without departing from the concepts of the present invention. For example, from Schroeder, et al., a frequency $f$ below about 5 kHz can be mapped into critical bands by the expression $$f = 650 \cdot \sinh \frac{x}{7} \tag{2}$$

where x=critical band number.

To simplify the following discussion, the term "critical-band density" shall refer to an input signal PSD mapped into frequency bands of any convenient bandwidth including critical bandwidths and subcritical bandwidths. The critical-band density of the input signal can be obtained from the appropriate mapping function according to $$S(x) = \hat{S}[f(x)] \frac{df}{dx} \tag{3}$$

where $\hat{S}(x)$=power spectral density of the input signal, and $S(x)$=critical-band density of the input signal.

In some embodiments of digital split-band coding systems, $S(x)$ is a discrete function of the log-power of signal critical band density with values which are multiples of approximately 6 dB. Critical band density information may be efficiently encoded differentially by constraining the values of $S(x)$ such that the change between adjacent subbands x does not exceed ±12 dB. Differential encoding of spectral information is disclosed more fully in U.S. patent application Ser. No. 08/115,513 filed Aug. 31, 1993 which is incorporated herein by reference in its entirety.

Excitation Pattern

An excitation pattern approximately describes the distribution of energy along the basilar membrane which results from the acoustic power represented by an interval of the input signal. An excitation pattern can be calculated from the convolution $$E(x)=S(x)*B(x) \tag{4}$$

where $E(x)$=is the excitation pattern resulting from the input signal, and $B(x)$=is a basilar-membrane spreading function.

Schroeder, et al. provide a convenient analytical expression for a spreading function across frequency bands having critical bandwidths. The expression, which provides the level of spreading in frequency band x resulting from a spectral component in frequency band $x_0$, is $$10 \log_{10} B(\Delta x) = \tag{5}$$
$$15.81 + 7.5 (\Delta x + 0.474) - 17.5 \sqrt{1 + (\Delta x + 0.474)^2} \quad dB$$

where $\Delta x = x - x_0$.

The convolution of the input signal critical-band density $S(x)$ and the spreading function $B(x)$ is computationally intensive, having a computational complexity on the order of N·M, where N is the number of points in $S(x)$ and M is the number of points in $B(x)$. As a result, it is not practical to use the Schroeder model in many coding systems, particularly in backward-adaptive coding systems.

Figure 8:
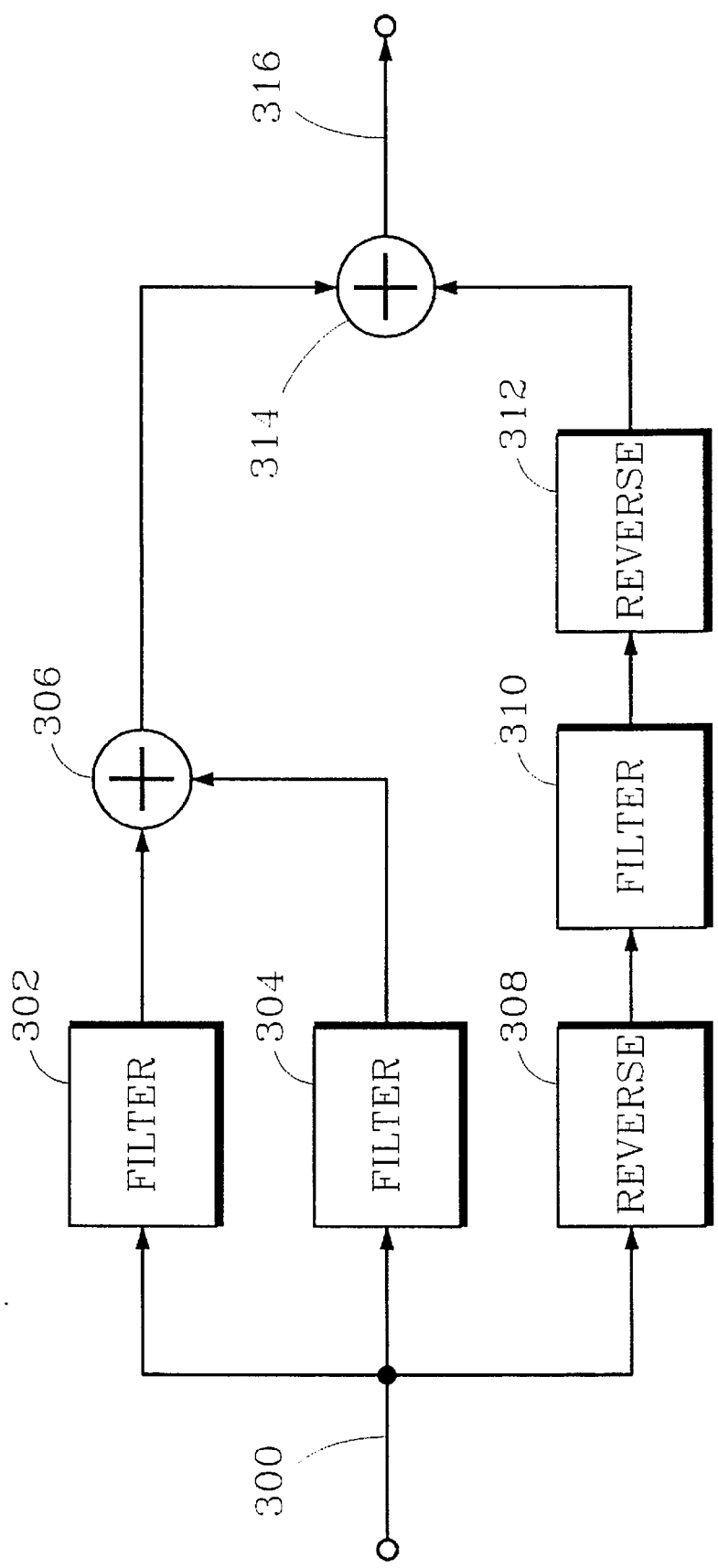
FIG. 8 is a block diagram illustrating an embodiment of a process by which an excitation pattern may be obtained efficiently.

FIG. 8 illustrates one embodiment of a process by which the excitation pattern may be obtained more efficiently, having a computational complexity on the order of N. According to this embodiment, information conveying input signal critical-band density is received from path 300, passed through three filters, and combined to form the excitation pattern.

The PSD may be scaled as a linear, logarithmic or other representation of power. If the PSD is a linear representation of input signal power and if the higher-frequency bands x have a bandwidth expressed in Barks which is substantially constant, then these filters can be implemented as a single-pole IIR filter with a transfer function represented by the recursive expression $$F_i(x)=a_i(x)+b_i(x) \cdot F_i(x-1) \tag{6}$$

where $a_i(x)$=gain factor for filter i, $b_i(x)$=rate of decay for filter i, $F_1(x)$=output of filter 302 at frequency band x, $F_2(x)$=output of filter 304 at frequency band x, and $F_3(x)$=output of filter 310 at frequency band x.

Figure 10A:
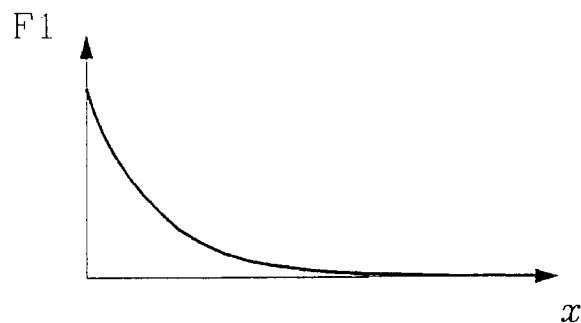
FIGS. 10a–10c are hypothetical graphical illustrations of impulse responses of single-pole filters which may be incorporated into the structure shown in FIG. 8.
Figure 10B:
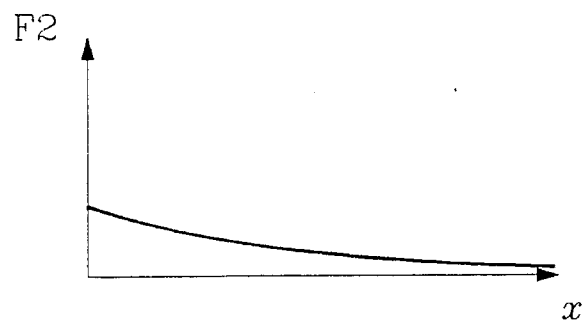
Figure 10C:
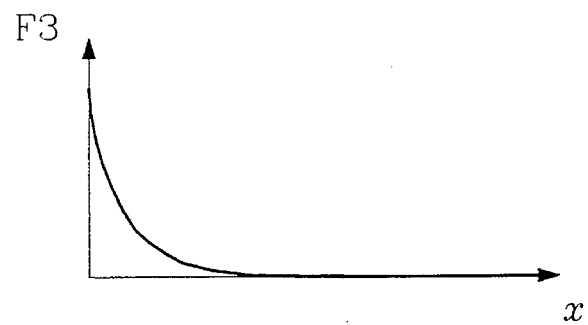

Hypothetical impulse responses of filter 302, filter 304 and filter 310 are illustrated in FIGS. 10a–10c, respectively.

If the PSD is a logarithmic representation of input signal power, filter calculations may be performed more efficiently in the log-power domain. One way in which these calculations may be performed is discussed below.

If the higher-frequency bands x do not have bandwidths expressed in Barks which are substantially constant, then a more complex transfer function may be required for one or more of the filters. For example, if the frequency bands have a constant bandwidth, filter 302 preferably has one or more zeroes with a transfer function such as $$F_i(x) = a_i(x) \cdot S(x) + b_i(x) \cdot F_i(x-1) + [1 - b_i(x)] \sum_{i=1}^{R_i(x)} S(x) \tag{7}$$

where $R_i(x)$=number of zeroes for filter $F_i$ at frequency band x.

Figure 11A:
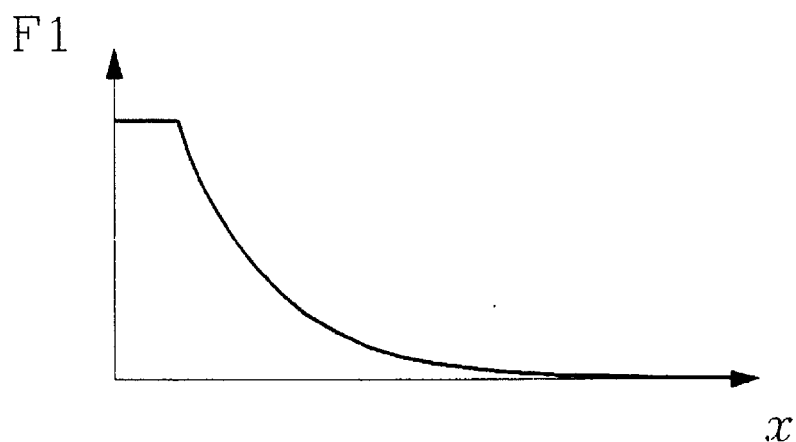
FIG. 11a is a hypothetical graphical illustration of an impulse response for a filter with one pole and one or more zeroes.

The third term in expression 7, in effect, delays the exponential decay in the impulse response. A hypothetical impulse response is shown in FIG. 11a. Each zero adds a "delay" of one frequency band. In general, more zeroes are used for higher-frequency bands. For example, if each element in the PSD of a 20 kHz bandwidth input signal corresponds to a transform coefficient generated by a 512-point transform, then perhaps as many as ten zeroes will be required for the highest-frequency bands, but no zeroes are required for bands below about 500 Hz.

The accuracy of the spreading function can be improved at the expense of greater computational complexity by using filter coefficients which are functions of the frequency band number x. Preferably, the recursive term coefficient $b_i(x)$ provides more spreading for spectral components at higher frequencies. By mapping the input signal PSD into a set of frequency bands having appropriate bandwidths, however, a spreading function with reasonable accuracy can be obtained using a recursive term coefficient $b_i$ which is substantially invariant. Some variation in coefficient $b_i$ is more likely required in many coding systems for lower-frequency bands because the critical bandwidths are much narrower.

The filter characteristics may be established according to the needs of the coding application. It should be emphasized that these filters operate in a frequency-band domain which is a mapped frequency domain. The decay term for the filters represents a spreading of acoustic energy along the basilar membrane and provides an effect similar to that provided by convolution with a spreading function.

Referring to FIG. 8, reverse 308 performs a frequency-band reversal of the information received from path 300 prior to filtering by filter 310, and reverse 312 performs a frequency-band reversal of the filtered output. The two reverse elements and the interposed filter represent the spreading function along the basilar membrane at frequencies below a stimulus frequency.

Figure 10D:
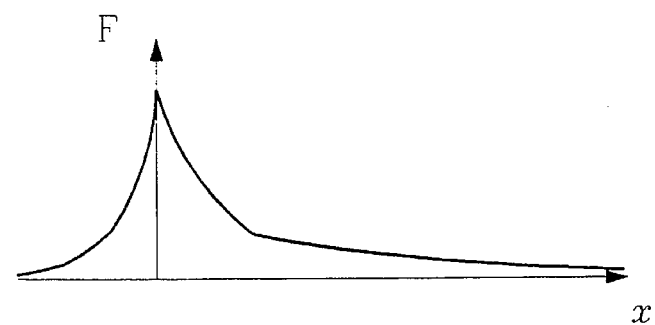
FIG. 10d is a hypothetical graphical illustration of the composite impulse response of the embodiment shown in FIG. 8 comprising filters having the impulse responses shown in FIGS. 10a–10c.

Component 306 and component 314 obtain the sum of their respective inputs. The sum resulting from component 314, which is the calculated excitation pattern, is passed along path 316. FIG. 10d represents the composite response of the structure illustrated in FIG. 8 which incorporates filters having the characteristics shown in FIGS. 10a–10c. If the critical-band density information received from path 300 is expressed in the log-power domain, then the sums calculated by component 306 and component 314 are log sums. One way in which log sums may be calculated is discussed below.

Figure 11B:
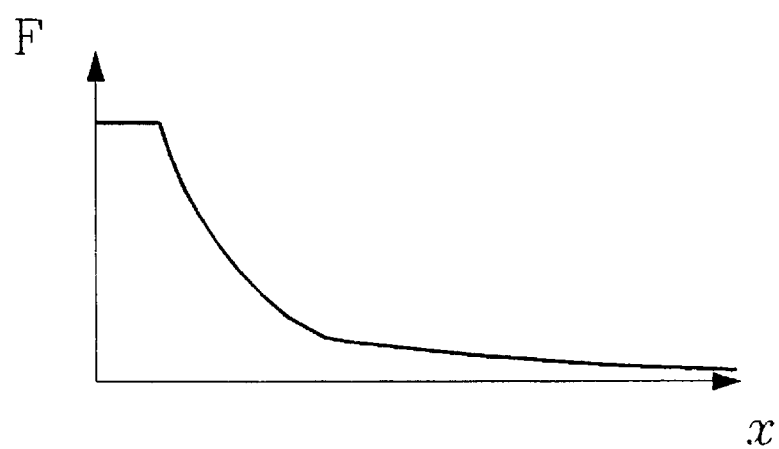

Many alternative embodiments are possible. For example, an embodiment having lower computational complexity may comprise only filter 302, filter 304 and component 306, and component 306 may combine the two filtered outputs by simply selecting the larger of the two. The results obtained by this simpler embodiment are acceptable in many high-quality coding applications. For example, FIG. 11b illustrates a hypothetical composite impulse response of this embodiment in which filter 302 has the impulse response shown in FIG. 11a and filter 304 has the impulse response shown in FIG. 10b. Table II shows filter coefficients $a_1(x)$ and $b_1(x)$ for filter 302 and coefficients $a_2(x)$ and $b_2(x)$ for filter 304 which are suitable for use in an embodiment using the PSD mapping shown in Table I. The coefficients are expressed in dB for use in the log-power domain, but may be easily converted to coefficients for use in the linear-power domain by dividing the entries in the table by ten and taking the antilogarithm of the quotient.

The filters may be implemented as IIR filters or FIR filters, but IIR filters are generally preferred because they are usually more efficient computationally. Computational complexity may be further reduced by performing the filter calculations in the log-power domain. The multiplications required to calculate expression 6 in the power domain can be implemented as additions in the log-power domain, or $$\log A = \log [a_i(x) \cdot S(x)] = \log a_i(x) + \log S(x) \quad (8)$$

$$\log B = \log [b_i(x) \cdot F_i(x-1)] = \log b_i(x) + \log F_i(x-1). \quad (9)$$

The addition of the two terms in expression 6 cannot be performed in a straight forward manner in the log-power domain. This addition, referred to as a "log sum," can be performed using the identity $$\log (A+B) = \max(\log A, \log B) + \log[1 + \exp(-|\log A - \log B|)] \quad (10)$$

where $\exp(y)$=antilogarithm of the quantity y. By constructing a lookup table of the expression $$\log[1 + \exp(-|\log A - \log B|)] \quad (11)$$

for a suitable range of values $|\log A - \log B|$, the addition in expression 6 may be performed in the log-power domain by (1) finding the absolute value of the difference between log A and log B, (2) obtaining a value from the lookup table by using this difference as a key, and (3) adding the value obtained from the lookup table to the larger of log A and log B. This implementation is not essential to practice the present invention, but it is useful in many embodiments to further reduce computational complexity.

The lookup table can be reasonably compact because the smaller term is essentially negligible for differences in $|\log A - \log B|$ greater than approximately 24 dB. In other words, reasonably accurate approximations of the log sum can be obtained for differences greater than approximately 24 db by assuming that the entry in the table is equal to zero.

Sensitivity Function

The basis of psychoacoustic masking effects is the fact that the human auditory system is desensitized by the presence of acoustic energy. A low-level signal, which is audible when isolated, may not be audible when accompanied by a much louder signal. The "sensitivity function" $w(x)$ of Schroeder, et al. approximates the degree to which the human auditory system is desensitized. This function, which provides the SNR required to ensure psychoacoustic masking within a critical band x, may be expressed as $$10\log_{10} w(x) = -(15.5 + x) \text{ dB}. \quad (12)$$

A simpler approach uses a sensitivity function of $w(x) = -20$ dB which simply sets the required SNR at a constant 20 dB.

In a preferred embodiment in which the maximum digital value represents 105 dB SPL, a conservative level is used to ensure masking by low-amplitude spectral components even when a playback system volume control is set to a very high level. This sensitivity function represented by the expression $$w(x) = \begin{cases} -40 \text{ dB} & \text{for } 1 \leq x < 36 \\ 1.923x - 107.308 \text{ dB} & \text{for } 36 \leq x < 49 \\ -15 \text{ dB} & \text{for } 49 \leq x \end{cases} \quad (13)$$

is suitable for use in an embodiment using the PSD mapping shown in Table I.

An interim masking threshold $Z(x)$ is defined relative to the excitation pattern $E(x)$, offset by the amount specified by the sensitivity function $w(x)$. The interim threshold is obtained from the expression $$Z(x) = w(x) + E(x) \quad (14)$$

in the log-power domain, or from the expression $$Z(x) = w(x) \cdot E(x) \quad (15)$$

in the linear-power domain.

Masking Threshold

By definition, all acoustic energy below the threshold of hearing is inaudible; therefore, the SNR required to ensure that quantizing noise is masked does not need to suppress the quantizing noise any lower than the threshold of hearing. The threshold of hearing is well defined in the art. For example, see ISO standard 226 which provides information pertaining to equal-loudness contours of a "minimum audible field" in the ISO Standards Handbook, *Acoustics*, 1990, pp. 20–25. The function $\theta(x)$ is used herein to represent an analytical expression of this threshold.

The psychoacoustic masking threshold $M(x)$ may be obtained by comparing the threshold of hearing with the interim masking threshold and choosing point by point the larger of the two thresholds. This may be represented as $$M(x) = \max[Z(x), \theta(x)]. \quad (16)$$

Allocation Values

In one simple embodiment, bits may be allocated at a rate of one bit for each 6 dB of required SNR, or $$A(x) = \begin{bmatrix} \frac{S(x) - M(x)}{6} & \text{for } S(x) \geq M(x) \\ 0 & \text{for } S(x) < M(x) \end{bmatrix} \quad (17)$$

where $A(x)$=allocation value for each spectral component in frequency band x.

In preferred embodiments, a more effective allocation is obtained by table lookup. The required SNR of the estimated spectral power $S(x)$ to the masking threshold $M(x)$ is used as the key into the lookup table, and each entry in the table represents the number of quantizing levels required to achieve the required SNR.

The lookup table entries may be based upon quantizing relationships well known in the art and used in various prior art coding systems. Conceptually, no particular lookup table is critical to the practice of the present invention but as a practical matter, the entries in the lookup table can significantly affect coding system performance.

One way in which entries in the table may be derived for a particular coding system is to measure the SNR resulting from that coding system incorporating quantization functions which are forced to quantize spectral information into a given number of quantizing levels. Table III, for example, indicates that a SNR of 8.21 dB and 11.62 dB are obtained by a particular embodiment of a coding system which uses a quantization function having three quantizing levels and five quantizing levels, respectively. According to the entries in this table, spectral components requiring a SNR of more than 8.21 dB but less than or equal to 11.62 dB should be allocated enough bits to be quantized into five levels.

In this implementation, the lower bound of the table is zero quantizing levels at 0 dB, and the upper bound of the table is set at some maximum number of bits referred to herein as the "allocation ceiling." According to the example shown in Table III, the allocation ceiling corresponds to 65,536 quantizing levels, which can be represented by 16 bits.

In many coding systems, the total of the allocation values is limited by a specified number of bits. This number is referred to herein as the "bit budget." If the total number of allocated bits exceeds the bit budget, the allocation function must revise the allocation values accordingly. If the total number of allocated bits is less than the bit budget, preferably the allocation function revises the allocation values to optimize the use of the residual bits.

In some embodiments, allocation values are refined by adjusting the level of the masking threshold $M(x)$ and recalculating the allocation values. Preferably, the threshold of hearing is taken into account as the masking threshold is raised and lowered. In one embodiment, this is accomplished by raising and lowering the interim masking threshold $Z(x)$ across some or all of the spectrum and reestablishing the masking threshold according to expression 16 until the total number of allocated bits is sufficiently close to the bit budget. For ease of discussion, the notation $M_0(x)$ is used to refer to an initial or "ideal" masking threshold obtained from a perceptual model before any adjustments are made to refine allocation values.

In one embodiment, the masking threshold may be lowered by as much as 72 dB and raised by as much as 24 dB with respect to the $M_0(x)$ masking threshold. These adjustments correspond to allocating approximately 12 additional bits and 4 fewer bits per spectral component, respectively. Initially, the masking threshold is set to a level 24 dB below $M_0(x)$, which is mid-way between the two extremes of 72 dB and −24 dB. The allocation values are calculated and compared to the bit budget. A binary search technique makes coarse adjustments to the masking threshold to converge the total bit allocation to a value which is equal to or less than the bit budget. The binary search reiterates the coarse adjustments until either the total bit allocation equals the bit budget or until the incremental adjustment to the masking threshold is less than 1.5 dB. Following these coarse adjustments, the binary search makes fine adjustments to the masking threshold to establish a level as much as 6 dB lower which converges the total bit allocation more closely to the bit budget. This binary search reiterates the fine adjustments until either the total bit allocation equals the bit budget or until the incremental adjustment to the masking threshold is less than 0.375 dB. The difference between the adjusted threshold and $M_0(x)$ may be passed in the encoded signal, allowing the decoder to establish the allocation values directly without repeating the convergence process.

This same coarse/fine adjustment process may be used in multi-channel coding systems in which bits are allocated to spectral components in all channels from a common pool of bits. In an alternative embodiment, coarse adjustments are made only to a masking threshold common to all channels. After the total allocation for all channels has converged sufficiently, fine adjustments are made to masking thresholds associated with individual channels until the total allocated bits is equal to or sufficiently close to the bit budget. The fine adjustments may be made by: (1) completing one adjustment to a respective masking threshold for each channel in turn, adjusting across all the channels until converging, or (2) adjusting a respective masking threshold for each channel in turn until converging, starting with a highest-priority channel and proceeding to a lowest-priority channel.

A process similar to that just described for multi-channel coding systems may be used in other coding systems with one or more channels. Bits may be allocated from a common pool of bits to spectral components over an extended period of time. In a transform coding system for example, coarse adjustments are made to allocations across multiple blocks of transform coefficients until the total allocation for the multiple blocks converges sufficiently close to the bit budget. The fine adjustments may be made by adjusting a respective masking threshold for each block in turn, adjusting across all of the blocks until converging. This process is applicable to other split-band coding systems such as sub-band coding systems. It may also be adapted for use in multi-channel coding systems.

As these examples show, many variations in the convergence process are possible. If an allocation ceiling is used in a particular implementation, then the convergence process should not allow an allocation value to exceed this ceiling.

If the masking threshold is raised to bring the total bit allocation within a bit budget, it is possible that one or more "intermediate" spectral components may exceed the initial threshold $M_0(x)$ but not exceed the adjusted threshold $M(x)$. According to expression 17, these intermediate spectral components are not allocated any bits and are, therefore, excluded from the encoded signal. This exclusion may be perceptible, especially if the exclusion is intermittent. For example, the harmonics of a sustained note may be intermittently excluded during intervals having considerable acoustic energy elsewhere in the spectrum.

If bits are allocated to these intermediate spectral components, the bit budget can be balanced by decreasing the allocation to larger spectral components; however, the resulting degradation in the coding quality of the larger spectral components is likely to be perceptible. Preferably, bits should be allocated so as to obtain a balance between the perceptible effects of excluding intermediate spectral components on the one hand and degrading the coding quality of larger spectral components on the other hand.

In one embodiment, an attempt to achieve such balance is made by allocating only a minimum number of bits to all intermediate spectral components. In a particular implementation, this is accomplished by quantizing all intermediate spectral components using the quantization function having the minimum number of quantizing levels.

In another embodiment, balancing is attempted by allocating a minimum number of bits to only those intermediate spectral components within a limited frequency range. This range extends from the highest-frequency spectral component which exceeds the adjusted masking threshold up to the upper limit of the encoded signal bandwidth.

In yet another embodiment, balancing may be attempted by allocating bits to only those intermediate spectral components which are no more than some level, say 9 dB, below the adjusted masking threshold. In a variation of this embodiment, the level below the adjusted threshold is modified to ensure that the number of bits allocated to intermediate spectral components does not exceed a percentage of the bit budget. As another example, the number of bits allocated to these intermediate spectral components may be balanced by controlling the bandwidth of the frequency range within which these allocations may take place.

The perceptible consequences of allocating bits to these intermediate spectral components may be reduced by controlling the rate at which these allocations may be changed. For example, intermediate spectral components may be excluded from allocation by reducing the allocation bandwidth over an interval of several hundreds of milliseconds. In effect, modifications to criteria used to exclude intermediate spectral components are subject to a low-pass filter.

Allocation of Residual Bits

If the number of bits allocated thus far is less than the bit budget, the residual bits may be allocated in any number of ways. In one embodiment, a two-step process is used: (1) starting with the lowest-frequency band and proceeding upward in frequency, the allocation for a frequency band is increased if either (a) the respective allocation value is more than zero and less than the allocation ceiling, or (b) the allocation value is zero and the allocation value for either adjacent frequency band was more than zero at the start of step 1; and (2) while any bits remain, starting with the lowest-frequency band and proceeding upward in frequency, the allocation value for each frequency band is increased if the respective allocation value is less than the allocation ceiling. Step 2 reiterates until no residual bits remain.

The allocation of residual bits can be avoided or minimized by allowing the convergence process to converge sufficiently close to the bit budget so that there are very few if any residual bits.

Decoder Spectral Distortion

Overview

Figure 12A:
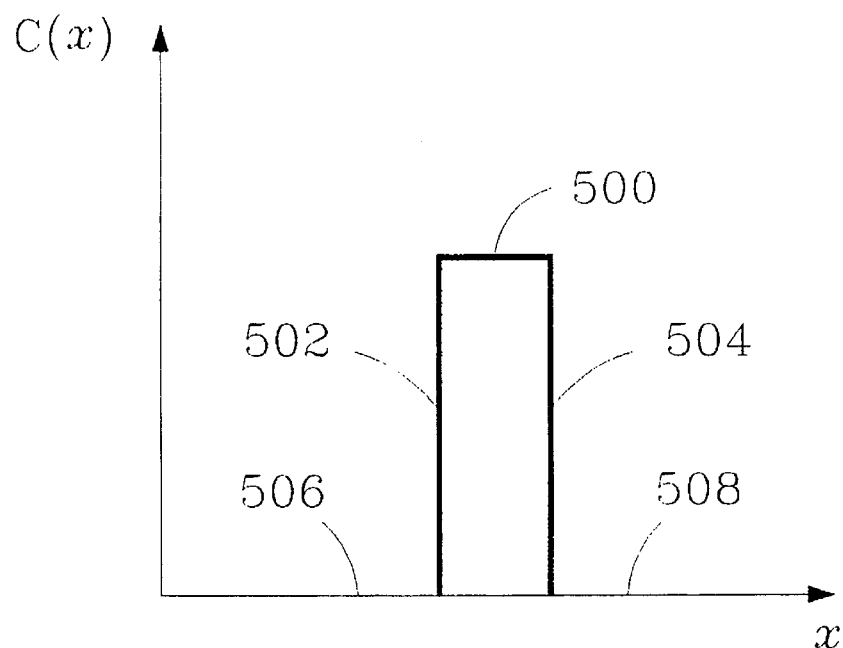
FIGS. 12a–12b are hypothetical graphical illustrations of passband filter frequency responses.

The analysis and synthesis filter banks used in various split-band coding systems may be thought of as a plurality of passband filters. FIG. 12a illustrates the frequency response of an ideal passband filter having unitary gain in the passband 500, infinitely steep transitions 502 and 504 at the passband cutoff frequencies, and zero gain in stopbands 506 and 508.

Figure 12B:
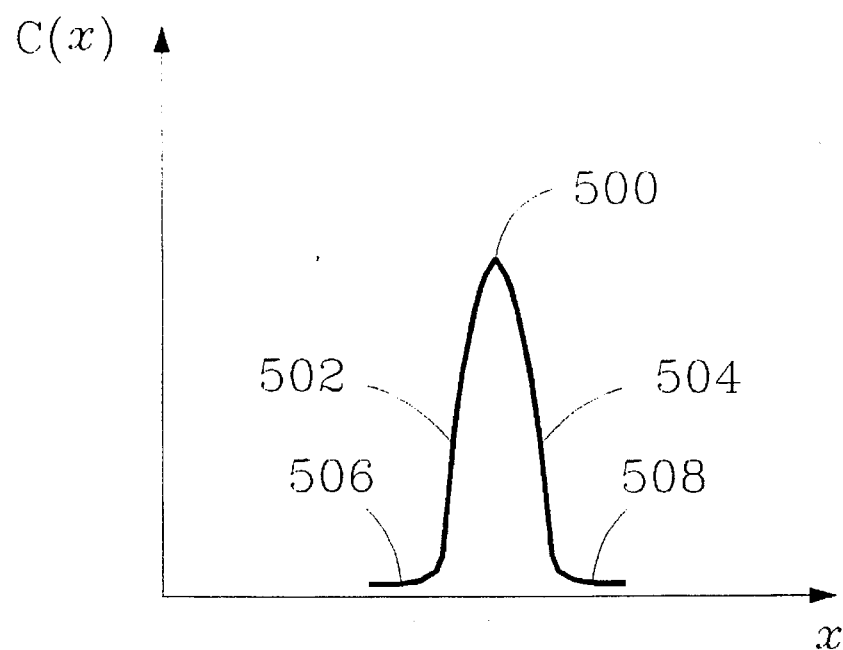

FIG. 12b illustrates the frequency response of a practical passband filter. Unlike the ideal passband filter, many practical passband filters have main lobe 500 with varying gain in the passband, passband skirts 502 and 504 with finite slope in the transition regions between the passband and the stopbands, and stopbands 506 and 508, possibly with sidelobes, providing a varying amount of gain. The width of the passband, rate of roll off in the transition regions, and level of stopband rejection are filter response characteristics which may be traded off against one another by filter design.

Figure 13A:
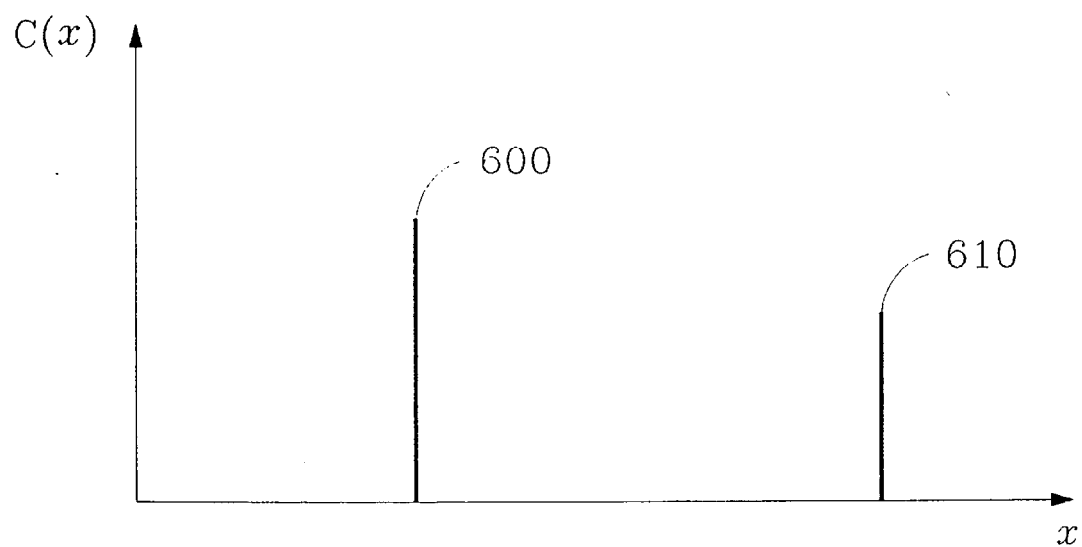
FIGS. 13a–13d are hypothetical schematic representations of spectra illustrating the effects of spectral distortions caused by analysis and synthesis filter banks.
Figure 13B:
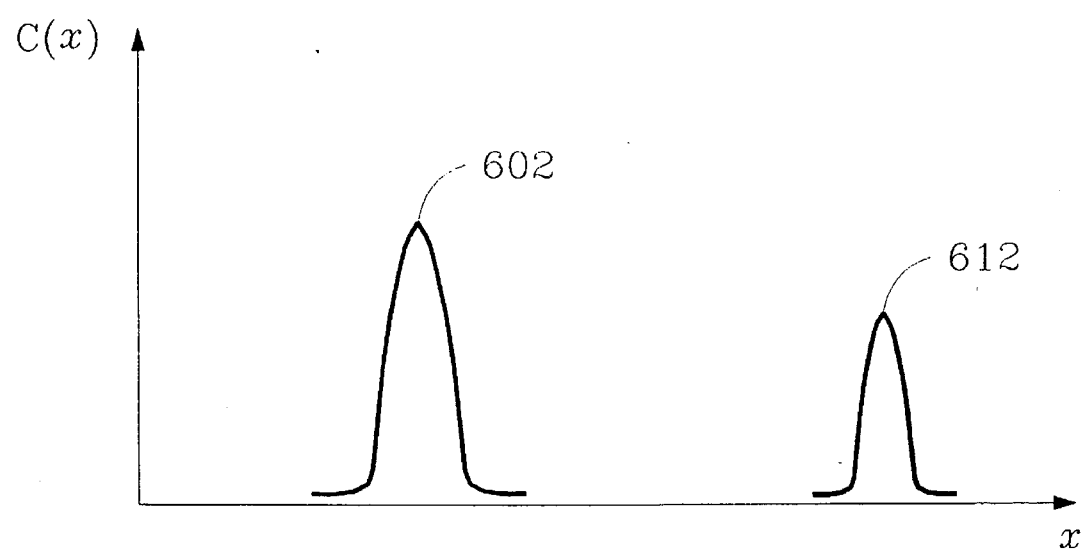

FIGS. 13a and 13b provide a hypothetical graphical illustration of the effects caused by an analysis filter bank comprising passband filters having frequency responses similar to that shown in FIG. 12b. FIG. 13a illustrates the true spectrum of a signal comprising two spectral components 600 and 610. FIG. 13b illustrates spectra 602 and 612 passed by the analysis filter bank in response to the true spectral components 600 and 610, respectively. The shape of the spectra may be established from the convolution of the analysis filter bank frequency response with the true spectrum of the original signal. The non-ideal frequency response of the passband filters cause the analysis filter bank to smear the shape of the true spectral components.

The characteristics of non-ideal filter banks used in signal analysis are generally well understood. For example, the effects of analysis windows upon the frequency response of a Discrete Fourier Transform is discussed in Harris, "On the Use of Windows for Harmonic Analysis with the Discrete Fourier Transform," *Proc. of IEEE*, vol. 66, January 1978, pp. 51–83. The response characteristics of several digital quadrature filters are discussed in Barnwell, "Subband Coder Design Incorporating Recursive Quadrature Filters and Optimum ADPCM Coders," *IEEE Trans. Acoust., Speech and Signal Proc.*, vol. ASSP-30, October 1982, pp. 751–65, and in Rothweiler, "Polyphase Quadrature Filters—A New Subband Coding Technique," *Proc. Int. Conf. Acoust., Speech and Signal Proc.*, 1983, pp. 1280–1283.

In principle, analysis filter bank spectral smearing need not cause a problem because a complementary synthesis filter bank may reverse the effects of the smearing and recover the exact original signal. This is true only in principle, however, because the synthesis filter bank can recover the exact original signal only if it is provided with the exact output of the analysis filter bank. In psycho-perceptual based coding systems, subband signals obtained from the analysis filter bank are quantized to reduce informational requirements and the resultant quantizing error prevents the synthesis filter bank from recovering the exact original signal.

Figure 13C:
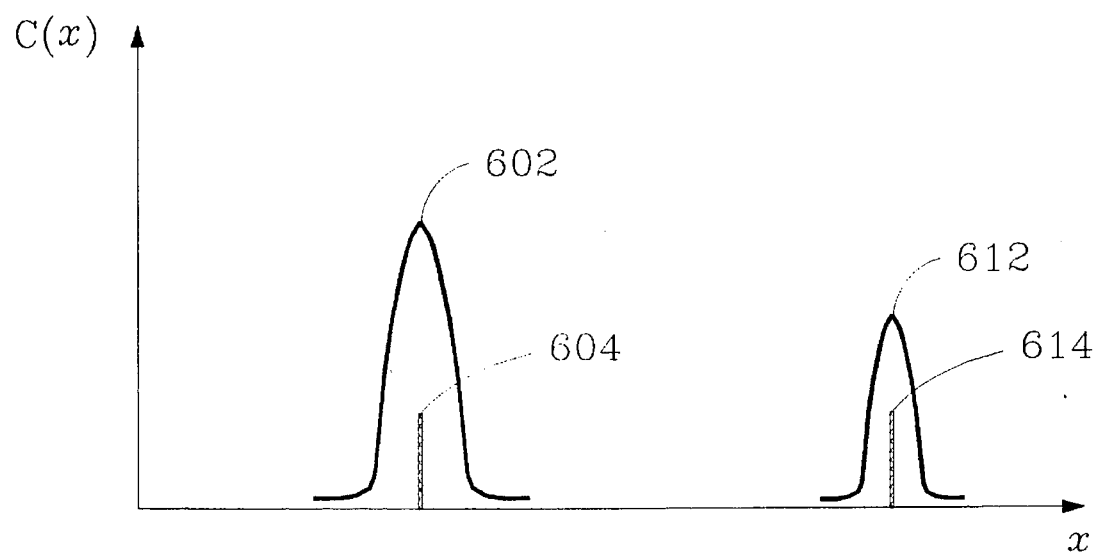
Figure 13D:
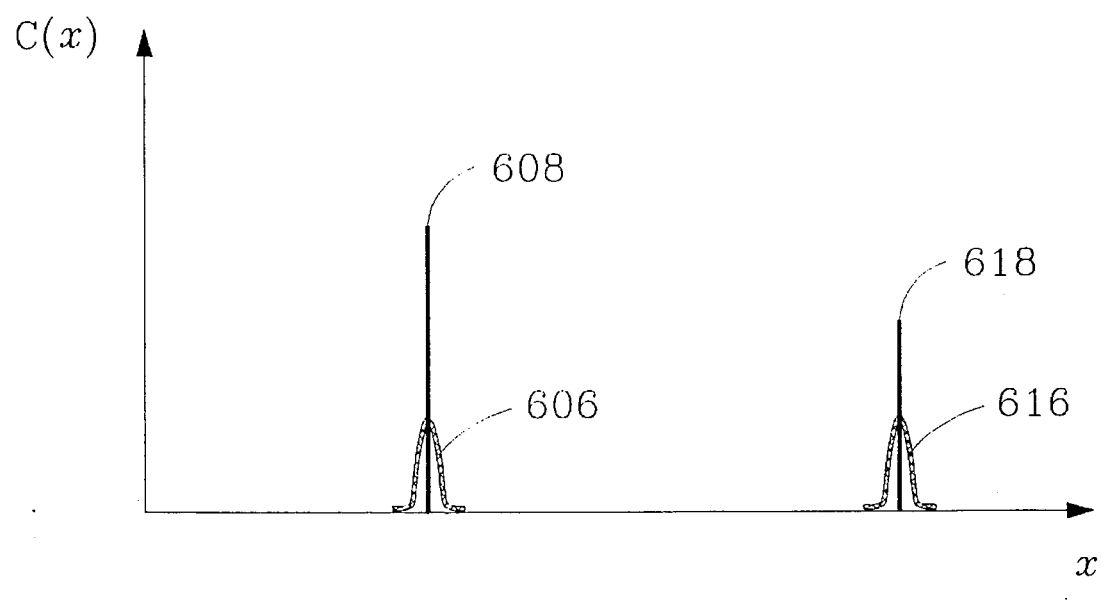

The effects of synthesis filter banks may be better understood from the following discussion and by referring to FIGS. 13c and 13d which provide a hypothetical graphical illustration of spectral distortion caused by a synthesis filter bank. FIG. 13c illustrates the smeared spectra 602 and 612 passed by an analysis filter bank with additional noise components 604 and 614 added to each respective smeared spectrum. The noise components represent the quantizing error resulting from quantizing only one principal component in each of the smeared spectra. All other components are not quantized. In practical split-band coding systems, unlike the illustration shown in FIG. 13c, all components of the encoder analysis filter bank output are quantized; however, in this hypothetical example, only one principal component in each smeared spectrum is quantized to more clearly show the effects of decoder synthesis filter bank spectral distortion.

FIG. 13d illustrates the spectral shape of the signal recovered by a decoder synthesis filter bank in response to the signal illustrated in FIG. 13c. Spectral components 608 and 618 correspond to true spectral components 600 and 610 in the original signal, and artifacts 606 and 616 are spectral distortions generated by the synthesis filter bank in response to quantizing noise components 604 and 614, respectively. The shape of artifacts 606 and 616 may be established from the convolution of the synthesis filter bank frequency response with noise components 604 and 614. In practical split-band coding systems, the spectral distortion is even greater because all components of the analysis filter bank output are quantized.

Although many practical split-band coding systems quantize subband signals nonuniformly, it may be instructional to point out that the distortion of a signal's true spectrum by a coding system using uniform quantization may be modeled by the convolution of the analysis filter bank frequency response with the synthesis filter bank frequency response.

This distortion model is not very useful in practical coding systems, however, because the signal's true spectrum is not available. Instead, a smeared representation of the true spectrum is available from the analysis filter bank. It is this smeared representation which is subject to reduction of information requirements such as by quantization. The quantized subband signals in an encoder, for example, already reflect the part of the total coding system distortion caused by the analysis filter bank. The distortion caused by the synthesis filter bank can be obtained by convolving the spectrum of the quantization noise with the frequency response of the synthesis filter bank.

The spectral distortion of the synthesis filter bank is responsible for why allocation functions which are based upon only perceptual models cannot always obtain correct allocation values. Many perceptual models are based upon empirical tests which attempt to establish the masking properties of signals comprising either a single-frequency sinewave or a very narrow band of noise. These masking models are based upon the true spectral shape of both the masking signal and the masked signals. Such perceptual models do not account for the synthesis filter bank smearing the spectrum of the noise resulting from quantization. As a result, allocation functions which base allocation decisions upon only such perceptual models cannot always obtain correct allocation values because the perceptual model overestimates masking effects.

Some allocation functions attempt to ensure that all coding artifacts will be imperceptible by adding a margin to the information requirements suggested by perceptual models. In one embodiment, for example, an encoder applies a perceptual model to establish information requirements and then allocates one or two more bits to ensure that quantization noise will be masked. This marginal allocation is suboptimal unless synthesis filter bank distortion effects are properly accounted for.

An allocation function may make allowances for decoder spectral distortions in a number of ways such as by adapting the psycho-perceptual model, by altering the established masking threshold, and/or by adjusting allocation values. For example, information requirements may be increased to allow for decoder spectral distortions by (1) reducing portions of excitation pattern E(x) obtained from expression 4, (2) by reducing portions of sensitivity function w(x) used in expressions 14 and 15, (3) by reducing portions of interim masking threshold Z(x) used in expression 16, (4) by reducing portions of established masking threshold M(x) obtained from expression 16, or (5) by increasing selected allocation values A(x).

The terms "adjusting bit allocation" and the like are used in the following discussion as generic terms for such allowances. In preferred embodiments, allowances are made by adapting the excitation pattern E(x); therefore, the embodiments discussed below illustrate how to adjust the excitation pattern. It should be understood, however, that these embodiments may be altered to use any of the other ways listed above.

Complex Process

Figure 14:
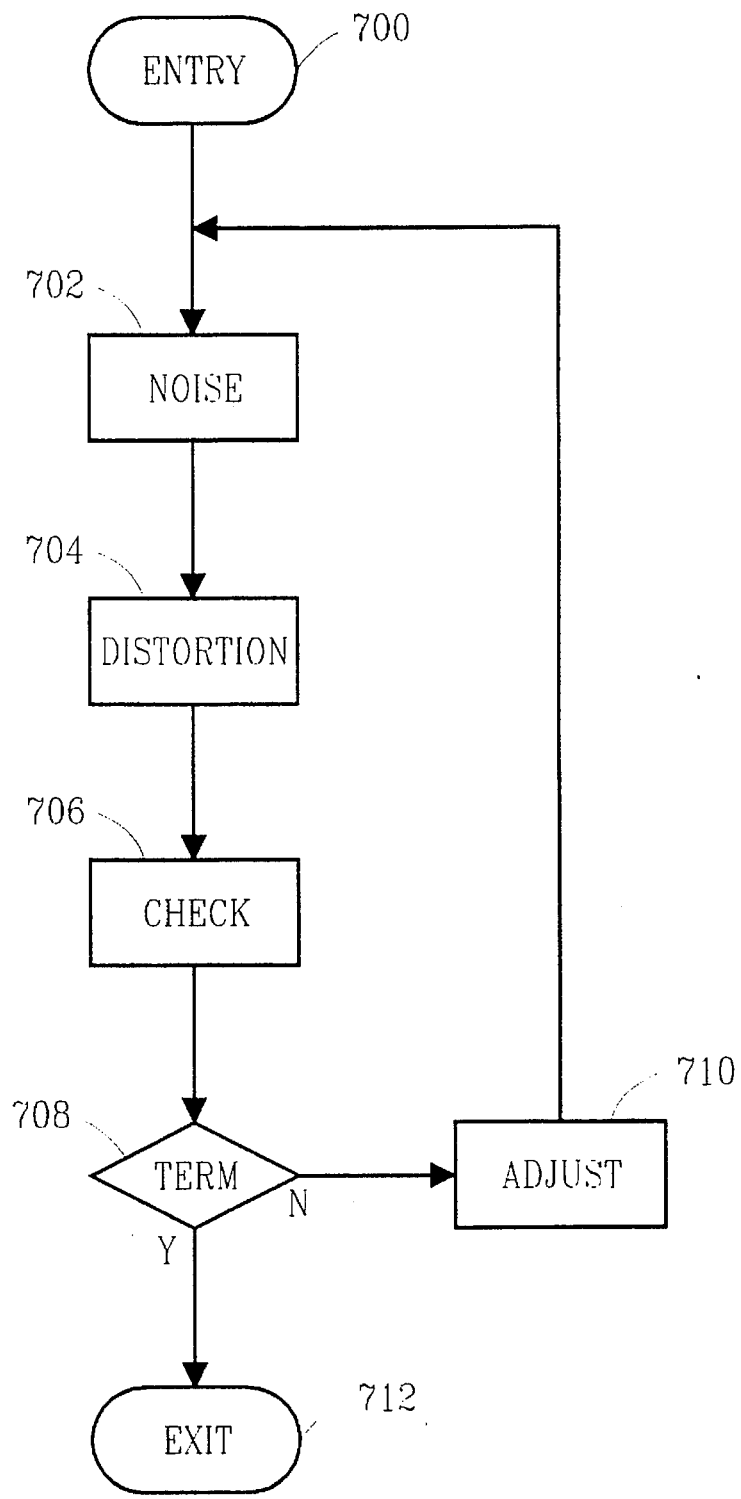
FIG. 14 is flow diagram illustrating the steps in one embodiment of a process which incorporates a decoder spectral distortion model.

FIG. 14 illustrates the steps in one embodiment of a process which incorporates a decoder spectral distortion model. At ENTRY 700, an allocation function has already established preliminary allocation values in accordance with psycho-perceptual principles.

NOISE 702 establishes a quantizing noise spectrum Q(x) in accordance with the established allocation values. A hypothetical example of the quantizing noise spectrum resulting from the quantization of subband signals obtained from an analysis filter bank is illustrated in FIG. 13c. Unlike this hypothetical example, however, all components of the subband signals are quantized.

DISTORTION 704 estimates the effects of decoding spectral distortion by convolving a synthesis filter bank passband filter frequency response D(x) with the quantizing noise spectrum Q(x) to obtain a decoder distortion spectrum N(x).

The convolution is computationally intensive. A process similar to that discussed above for obtaining an excitation pattern, an embodiment of which is illustrated in FIG. 8, may also be used to implement an efficient process to estimate decoding spectral distortion.

CHECK 706 establishes whether any portion of N(x) will be perceptible in the signal recovered by the decoder by comparing N(x) with an established masking threshold M(x). If any portion of N(x) exceeds a respective portion of M(x), that portion of N(x) is expected to be perceptible.

TERM 708 determines whether to reiterate the foregoing steps. If N(x) does not exceed M(x) anywhere, no further processing is required because all N(x) is expected to be imperceptible. EXIT 712 is performed next.

If N(x) exceeds M(x) in a substantially uniform manner across the spectrum and no additional bits are available for allocation, further processing is not expected to reduce the perceptibility of N(x). EXIT 712 is performed next.

Otherwise, ADJUST 710 is performed next.

ADJUST 710 adjusts the bit allocation for selected spectral components to reduce the perceptibility of coding artifacts. This may be accomplished by identifying Q(x) components which are large contributors to the portions of N(x) which exceed M(x), and increasing the bit allocation to selected Q(x) components which are the largest contributors.

A way in which the largest contributors may be identified can be derived by first recalling that the decoder distortion spectrum N(x) is obtained from the convolution Q(x)*D(x), which may be expressed as $$N(x) = \sum_{i=-\infty}^{\infty} Q(x) \cdot D(i-x). \tag{18}$$

The largest Q(x) contributors to a specific portion of the distortion spectrum, say $N(x_0)$, may be identified by ascertaining for which subbands x the terms $Q(x) \cdot D(x_0-x)$ are largest. This is equivalent to weighting each Q(x) component with frequency response D(−x) centered about a subband $x_0$ in which N(x) is expected to be perceptible, and selecting the Q(x) components corresponding to the largest weightings.

If the total bit allocation exceeds a bit budget, bit allocations are decreased for Q(x) components which either contribute to portions of N(x) not exceeding threshold M(x) or which contribute least to portions of N(x) which do exceed M(x). The process reiterates by returning to step NOISE 702.

In audio coding systems using the psychoacoustic model discussed above, these adjustments are accomplished preferably by adapting the excitation pattern E(x).

At EXIT 712, the process of making allowance for decoder spectral distortions is completed.

Simplified Process

A simpler process can achieve good results by exploiting the fact that the effects of decoder spectral distortion are usually imperceptible unless the synthesis filter bank smears the quantizing noise more widely in frequency than can be masked by the true spectral components of the coded signal. This condition is more likely to exist when the masking threshold established from spectral components passed by the analysis filter bank rolls off more rapidly than the synthesis filter bank frequency response.

In many filter bank implementations, the rate of frequency response roll off may be increased but, as a consequence, the depth of stopband rejection is decreased. For many implementations of synthesis filter banks, even minimal requirements for stopband rejection prevent response roll off from equalling or exceeding established masking threshold roll off for lower-frequency masking by low- to medium-frequency spectral components. For example, a filter bank implemented by a 512-point transform with a sampling rate of 48 kHz generally cannot achieve a filter response with roll off more than about 12 dB per coefficient or 93.75 Hz (48 kHz / 512) without reducing the level of stopband rejection below about 100 dB.

In comparison to the filter frequency response, a masking threshold for spectral components above about 4 kHz rolls off at approximately 2 dB per coefficient for downward-frequency masking. By contrast, a masking threshold of spectral components within the range from about 400 Hz to about 3 kHz rolls off at approximately 10 to 15 dB per coefficient for downward-frequency masking. As a result, coding systems incorporating synthesis filter banks with characteristics similar to those just described should make allowances for decoder spectral distortions at frequencies below about 3 kHz, but probably do not need to make allowances at higher frequencies.

Figure 15A:
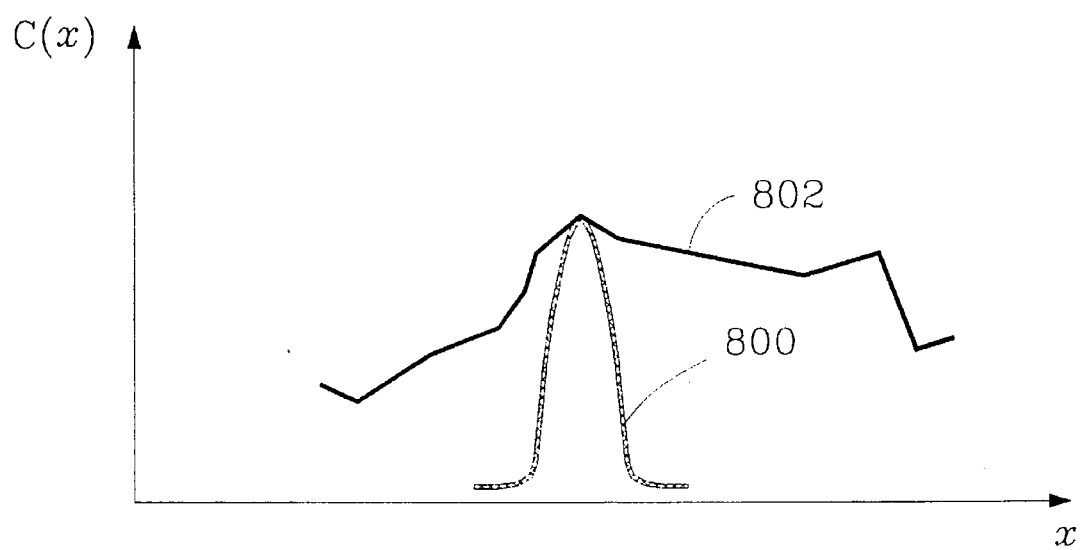
FIG. 15a is a hypothetical graphical illustrations of a passband filter frequency response compared with the psychoacoustic masking threshold of a high-frequency spectral component.

Referring to FIG. 15a, threshold 802 represents a psychoacoustic masking threshold of a high-frequency spectral component and response 800 represents a frequency response of a respective passband filter in a hypothetical synthesis filter bank. Masking threshold 802 rolls off less rapidly than filter frequency response 800. It is not likely that decoder spectral distortion will smear high-frequency coding artifacts to such an extent that they become perceptible; therefore, an allocation function may more safely ignore decoder spectral distortions for higher frequencies.

Figure 15B:
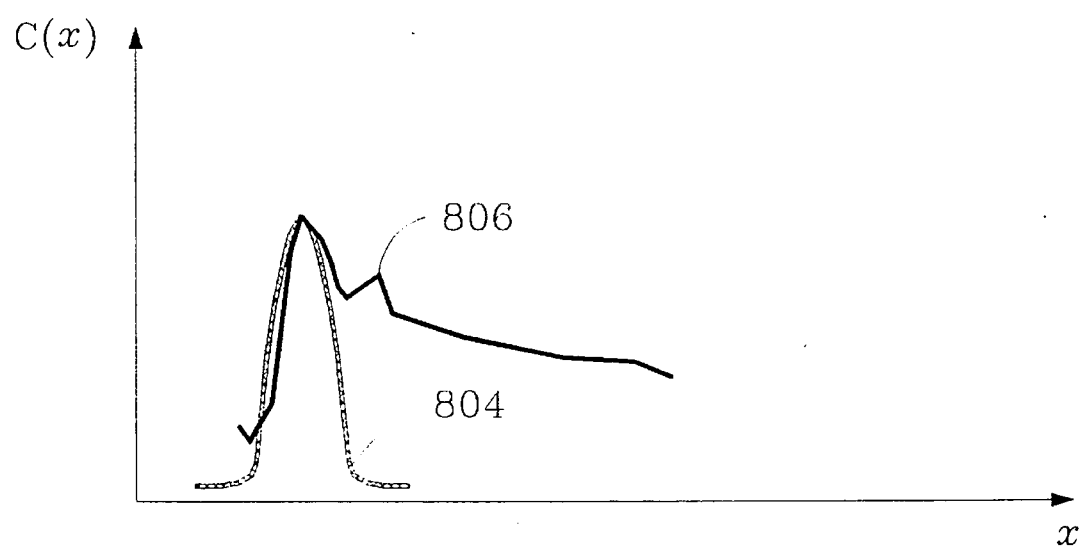
FIG. 15b is a hypothetical graphical illustrations of a passband filter frequency response compared with the psychoacoustic masking threshold of a low- to medium-frequency spectral component.

FIG. 15b illustrates threshold 806 which represents the psychoacoustic masking threshold of a low- to medium-frequency spectral component and response 804 represents a frequency response of a respective passband filter in a hypothetical synthesis filter bank. For frequencies below the masking component, masking threshold 806 rolls off more rapidly than filter frequency response 804. It is much more likely that decoder spectral distortion may smear low- and medium-frequency coding artifacts to such an extent that they become perceptible; therefore, an allocation function may not safely ignore decoder spectral distortions for lower frequencies. The example illustrated in FIG. 15b indicates that quantizing noise must be reduced on the low-frequency side of dominant spectral components to ensure that coding system artifacts are inaudible.

Whether allowances must be made for decoder spectral distortions depends upon the masking threshold established in response to the spectral shape of the signal to encode. It is important to recall that masking thresholds such as those shown in FIGS. 15a and 15b pertain to the masking characteristics of single-frequency spectral components or very narrow bands of noise. The masking characteristics of a complex signal with many spectral components is very different. For example, the masking threshold of white noise is fairly flat; therefore, decoder spectral distortion is of no particular concern for signals with essentially flat spectral shapes.

A simplified process identifies potential situations like that illustrated in FIG. 15b by examining the critical band density S(x) of subband signals passed by an analysis filter bank in low- and medium-frequency subbands. If changes in S(x) across the lower part of the spectrum are substantially equal to or greater than the rate of frequency response roll off for respective passband filters in the synthesis filter bank, then allowances are made for decoder spectral distortions.

The concepts of the simplified process may be used in a wide variety of implementations and embodiments but the embodiments described here are based upon the following assumptions: (1) the implementations are for digital audio coding systems; (2) the critical band density is approximated by a discrete log-power function S(x) constrained to multiples of 6 dB increments between adjacent subbands of no more than ±12 dB, (3) the synthesis filter bank is implemented by a transform having a passband of approximately 94 Hz, a frequency response roll off of about 12 dB per coefficient and stopband rejection of about 100 dB; (4) the number of bits allocated to quantize the subband signals without regard for decoder spectral distortions is just enough to reduce the quantizing noise below the established masking threshold; and (5) the masking threshold is established according to the most accurate psychoacoustic model which can be implemented practically.

First Embodiment

The following program fragment illustrates a first embodiment of a simplified process which may be incorporated into an allocation function to allow for decoder spectral distortion.

```
(101)  for i from 0 to 25
(102)    if S(i+1) − S(i) = 12 then
(103)      set j = i + 1
(104)      set k = 0
(105)      while k = 0 and j < 26
(106)        if S(j+1) − S(j) ≠ 12 then
```

```
(107)        set k = j - i
(108)      endif
(109)      set j = j + 1
(110)    endwhile
(111)    if k < 3 and k ≠ 0 then
(112)      set a = 6
(113)    else
(114)      set a = 12
(115)    endif
(116)    for i from i + 1 to j - 1
(117)      set E(i) = E(i) - a
(118)      if E(i) < 0 then
(119)        set E(i) = 0
(120)      endif
(121)    endfor
(122)    if S(j) - S(j-1) = 6 then
(123)      set E(j) = E(j-1)
(124)    endif
(125)    set i = j
(126)  endif
(127) endfor
```

Line (101) reiterates the process performed in lines (102) to (127) for subbands zero to twenty five which cover the spectrum below about 2.4 kHz. If line (102) determines that the critical band density increases by 12 dB from subband i to i+1, then lines (103) to (126) are performed; otherwise, the process continues with line (102) checking the next subband.

At line (103), variable i references the first subband in a possible interval of subbands in which the critical band density increases by 12 dB. Line (103) initializes variable j to reference the following subband and line (104) initializes variable k to zero.

Line (105) reiterates the process in lines (106) to (110) until either the variable k is set to a nonzero value or until the variable j is no longer less than 26. Lines (106) to (110) establish the number of subbands in the interval across which the critical band density increases by 12 dB. If line (106) determines that the increase between subband j+1 and subband j is not 12 dB, then line (107) sets variable k equal to the number of subbands in the interval. This causes line (105) to stop reiterating lines (106) to (110). Line (109) increments the variable j to reference the next subband.

If line (111) determines that the length of the interval is less than three, then line (112) sets variable a to six; otherwise, line (114) sets the variable a to twelve. The variable a represents the amount in dB by which the excitation pattern E(x) will be reduced to allow for decoder spectral distortion. The pattern is reduced more for longer intervals of subbands in which the critical band density increases by 12 dB because larger amounts of spectral smearing occurs for longer intervals. The reason for the additional reduction may be appreciated by recalling that the spectral distortion may be modeled by convolving the synthesis filter frequency response with the quantization noise spectrum, and that the synthesis filter frequency response rolls off at about 12 dB per transform coefficient (or per critical band at lower frequencies) which is substantially the same as the rate of increase in the critical band density. The convolution will smear the quantization noise spectrum more widely in frequency for longer intervals.

Line (116) reiterates the process performed in lines (117) to (121) in which E(i) is reduced by the amount specified by variable a. The subbands in which the pattern is reduced correspond to the subbands in the interval across which the critical band density increases by 12 dB. If line (118) determines that the excitation pattern has been reduced to less than zero for any subband, then line (119) resets the pattern to zero for that subband.

If line (122) determines that the increase in critical band density following the interval is 6 dB, then the excitation pattern is also adjusted in that following subband.

Line (125) sets the variable i equal to the variable j. This causes the reiteration of lines (102) to (127) to continue with the subband following subband j.

Several tables illustrate the results of the process just described. Table IV represents an interval of two subbands across which the critical band density S(x) increases by 12 dB. This interval is followed by an increase which is not 6 dB. The row for Δ(x) shows the change in critical band density between adjacent subbands. The row for e(x) shows the amount of adjustment which would be applied to the excitation pattern.

Table V represents an interval of three subbands across which the critical band density increases by 12 dB. The interval of 12 dB increases is followed by an increase which is not 6 dB.

Table VI represents an interval of two subbands across which the critical band density increases by 12 dB. The interval of 12 dB increases is followed by an increase which is equal to 6 dB.

Table VII represents an interval of three subbands across which the critical band density increases by 12 dB. The interval of 12 dB increases is followed by an increase which is equal to 6 dB.

Second Embodiment

The following program fragment illustrates a second embodiment of a simplified process which may be incorporated into an allocation function to allow for decoder spectral distortion. Although the results obtained by this second embodiment are generally not as good as those obtained by the first embodiment, the second embodiment is attractive in certain implementations because it is computationally more efficient.

```
(201) a = 0
(202) for i from 0 to 25
(203)   if S(i+1) - S(i) = 12 then
(204)     if a < 18 then
(205)       set a = a + 6
(206)     endif
(207)     set E(i) = E(i) - a
(208)   else
(209)     if S(i+1) - S(i) ≤ -6 then
(210)       if a > 0 then
(211)         set a = a - 6
(212)       endif
(213)       set E(i) = E(i) - a
(214)     endif
(215)   endif
(216) endfor
```

Line (201) initializes variable a to zero. Line (202) reiterates the process performed in lines (203) to (216) for subbands zero to twenty five.

If line (203) determines that the change in the critical band density from subband i to subband i+1 is +12 dB, then lines (204) to (206) increase variable a by 6 dB, up to a maximum of 18 dB. The variable a represents the amount in dB by which the excitation pattern E(x) will be reduced to allow for decoder spectral distortion. This amount increases for longer intervals of subbands in which the critical band density increases by 12 dB because larger amounts of spectral smearing occurs for longer intervals. Refer to the discussion above for the first embodiment which provides more details. Line (207) reduces E(i) by the amount specified by variable a. If line (203) determines that the change in the critical band density from subband i to subband i+1 is not +12 dB, then line (209) determines if the change is −6 dB or less. If it is, lines (210) to (212) decrease variable a by 6 dB, down to a minimum of 0 dB. Line (213) reduces E(i) by the amount specified by variable a.

Third Embodiment

The following program fragment illustrates a third embodiment of a simplified process which may be incorporated into an allocation function to allow for decoder spectral distortion.

```
(301)   a = 0
(302)   for i from 0 to 25
(303)       switch
(304)           case S(i+1) − S(i) = 12 :
(305)               set a = a + 6
(306)           case S(i+1) − S(i) = 6 :
(307)               if S(i+2) − S(i+1) = 12 then
(308)                   set a = a − 3
(309)               else
(310)                   set a = a − 6
(311)               endif
(312)           case S(i+1) − S(i) = 0 :
(313)               set a = a − 6
(314)           case S(i+1) − S(i) = −6 :
(315)               if S(i+2) − S(i+1) = 12 then
(316)                   set a = a − 6
(317)               else
(318)                   set a = a − 9
(319)               endif
(320)           case S (i+1) − S(i) = −12 :
(321)               set a = a − 12
(322)       endswitch
(323)       if a > 18 then
(324)           set a = 18
(325)       endif
(326)       if a < 0 then
(327)           set a = 0
(328)       endif
(329)       set E(i) = E(i) − a
(330)   endfor
```

Line (301) initializes variable a to zero. Line (302) reiterates the process performed in lines (303) to (330) for subbands zero to twenty five. Lines (303) to (322) adjust the value of variable a according to changes in the critical band density between adjacent subbands. For example, line (313) decreases variable a by 6 if the critical band density does not change between subband i and subband i+1. As another example, if the critical band density changes by +6 dB from subband i to subband i+1, then lines (307) to (311) either decrease variable a by 3 if the critical band density changes by +12 dB from subband i+1 to subband i+2, or decrease variable a by 6 otherwise. Lines (323) to (328) ensure that variable a is not greater than 18 and is not less than zero. Line (329) reduces excitation pattern E(i) by the amount specified by variable a.

This embodiment "looks ahead" to the next higher-frequency subbands. Other embodiments may look even further ahead. If computational resources permit, an embodiment could analyze the change in critical band density across all or substantially all subbands of interest before adjusting the excitation pattern.

Adaptor

In split-band coding systems using allocation functions which are based upon various psycho-perceptual effects, any parameter affecting the underlying psycho-perceptual model may be modified to adapt the allocation function. In audio coding applications, for example, such parameters include (1) the filter coefficients of equation 6 or equation 7 which model the level of psychoacoustic masking above and/or below a masking tone, (2) the characteristics of the sensitivity function which provides the SNR offset from the excitation pattern, (3) the level of inter-channel masking in a multi-channel system, (4) the bandwidth of the input signal, (5) the minimum number of bits to allocate to subband signals as a function of frequency, (6) the allocation ceiling, possibly as a function of frequency, (7) the number of additional bits to allocate to a spectral component for each incremental increase in amplitude as a function of spectral amplitude, and (8) the amount by which to adjust an excitation pattern when decoder spectral distortions are expected to be perceptible. Empirical evidence indicates that a higher SNR is required to achieve masking at higher amplitudes; therefore, an allocation of one additional bit per 6 dB increase in amplitude may be required at high amplitudes but an allocation of only one bit per 12 db increase may be adequate at lower amplitudes.

Adaptor 120 may utilize either or both of the "parameter" technique and the "value" technique to adapt the results of the allocation function. The "parameter" technique entails modifying one or more parameters such as those discussed above. The "value" technique entails generating one or more modified values which are merged with the allocation values obtained from the allocation function.

The particular process used to implement either technique is not critical to the practice of the present invention. One approach comprises performing an alternative allocation function, comparing the results of the alternate function with the "basic values" obtained from basic allocation function 110, and forming modified values for each alternate value where the difference between it and the respective basic value is significant. The complexity of the basic allocation function may be restricted so as to simplify the decoder, but the alternate allocation function may be as complex as desired. In audio coding applications, for example, the alternate function may use a more sophisticated psychoacoustic model including consideration for signal characteristics such as the flatness of the input signal spectrum, the average or peak amplitude of the input signal, and whether a masking component is tone-like or noise-like.

Another exemplary adapting process avoids performing a complete allocation function, merely generating adjustments to the basic allocation values in response to the detection of various signal characteristics. For example, the basic allocation values may be increased in response to detecting tone-like masking components, or the basic allocation values may be decreased in response to detecting that the input signal spectrum is essentially flat.

As discussed above, adaptor 120 may be responsive to the input signal, the subband signals obtained from filterbank 102, the X words obtained from converter 112, or any other information of significance to the particular application. In a coding system for a long-distance telephone network, for example, adaptor 120 may be responsive to date, time-of-day and day-of-week information so as to provide an allocation function which reduces bit allocations, thereby trading off lower information requirements with higher fidelity coding, in anticipation of forecasted increases in traffic through the network.

In a digital video display system, for example, adaptor 120 may provide an allocation function which is responsive to operator input, thereby allowing the operator to tradeoff shorter display response times against higher picture resolutions.

As these examples show, adaptor 120 may be responsive to any information which is desired in a particular application. The choice of this information is not critical to the practice of the present invention.

It should be appreciated that the present invention may be practiced within numerous embodiments implemented by a wide variety of techniques.

TABLE 1

Critical-Band Mapping

| Band No. x | Low Freq. (kHz) | High Freq. (kHz) | Band No. x | Low Freq. (kHz) | High Freq. (kHz) |
|---|---|---|---|---|---|
| 1 | 0.0250 | 0.0750 | 26 | 1.9250 | 2.0750 |
| 2 | 0.0750 | 0.1250 | 27 | 2.0750 | 2.2375 |
| 3 | 0.1250 | 0.1750 | 28 | 2.2375 | 2.4125 |
| 4 | 0.1750 | 0.2250 | 29 | 2.4125 | 2.6000 |
| 5 | 0.2250 | 0.2750 | 30 | 2.6000 | 2.8000 |
| 6 | 0.2750 | 0.3250 | 31 | 2.8000 | 3.0250 |
| 7 | 0.3250 | 0.3750 | 32 | 3.0250 | 3.2750 |
| 8 | 0.3750 | 0.4250 | 33 | 3.2750 | 3.5500 |
| 9 | 0.4250 | 0.4800 | 34 | 3.5500 | 3.8500 |
| 10 | 0.4800 | 0.5400 | 35 | 3.8500 | 4.2000 |
| 11 | 0.5400 | 0.6025 | 36 | 4.2000 | 4.6000 |
| 12 | 0.6025 | 0.6675 | 37 | 4.6000 | 5.0500 |
| 13 | 0.6675 | 0.7350 | 38 | 5.0500 | 5.5500 |
| 14 | 0.7350 | 0.8050 | 39 | 5.5500 | 6.1000 |
| 15 | 0.8050 | 0.8800 | 40 | 6.1000 | 6.7000 |
| 16 | 0.8800 | 0.9600 | 41 | 6.7000 | 7.3750 |
| 17 | 0.9600 | 1.0425 | 42 | 7.3750 | 8.1250 |
| 18 | 1.0425 | 1.1275 | 43 | 8.1250 | 9.0000 |
| 19 | 1.1275 | 1.2200 | 44 | 9.0000 | 10.0000 |
| 20 | 1.2200 | 1.3200 | 45 | 10.0000 | 11.2500 |
| 21 | 1.3200 | 1.4275 | 46 | 11.2500 | 12.7500 |
| 22 | 1.4275 | 1.5425 | 47 | 12.7500 | 14.5625 |
| 23 | 1.5425 | 1.6625 | 48 | 14.5625 | 16.6875 |
| 24 | 1.6625 | 1.7875 | 49 | 16.6875 | 18.8750 |
| 25 | 1.7875 | 1.9250 | 50 | 18.8750 | 21.0620 |

TABLE II

Filter Coefficients

| Band x | $a_1(x)$ (dB) | $b_1(x)$ (dB) | $a_2(x)$ (dB) | $b_2(x)$ (dB) | Band x | $a_1(x)$ (dB) | $b_1(x)$ (dB) | $a_2(x)$ (dB) | $b_2(x)$ (dB) |
|---|---|---|---|---|---|---|---|---|---|
| 1 | 0.000 | −15.000 | −40.000 | −1.600 | 26 | 0.000 | −6.700 | −22.000 | −0.400 |
| 2 | 0.000 | −6.400 | −35.000 | −2.000 | 27 | 0.000 | −6.578 | −22.889 | 0.000 |
| 3 | 0.000 | −6.550 | −28.500 | −1.850 | 28 | 0.000 | −6.456 | −23.778 | 0.000 |
| 4 | 0.000 | −6.700 | −22.000 | −1.700 | 29 | 0.000 | −6.333 | −24.667 | 0.000 |
| 5 | 0.000 | −6.700 | −21.333 | −1.717 | 30 | 0.000 | −6.211 | −25.556 | 0.000 |
| 6 | 0.000 | −6.700 | −20.667 | −1.733 | 31 | 0.000 | −6.089 | −26.444 | 0.000 |
| 7 | 0.000 | −6.700 | −20.000 | −1.750 | 32 | 0.000 | −5.967 | −27.333 | 0.000 |
| 8 | 0.000 | −6.700 | −19.333 | −1.767 | 33 | 0.000 | −5.844 | −28.222 | 0.000 |
| 9 | 0.000 | −6.700 | −18.667 | −1.783 | 34 | 0.000 | −5.722 | −29.111 | 0.000 |
| 10 | 0.000 | −6.700 | −18.000 | −1.800 | 35 | 0.000 | −5.600 | −30.000 | 0.000 |
| 11 | 0.000 | −6.700 | −18.000 | −1.771 | 36 | 0.000 | −5.554 | −31.923 | 0.000 |
| 12 | 0.000 | −6.700 | −18.000 | −1.743 | 37 | 0.000 | −5.508 | −33.846 | 0.000 |
| 13 | 0.000 | −6.700 | −18.000 | −1.714 | 38 | 0.000 | −5.462 | −35.769 | 0.000 |
| 14 | 0.000 | −6.700 | −18.000 | −1.686 | 39 | 0.000 | −5.415 | −37.692 | 0.000 |
| 15 | 0.000 | −6.700 | −18.000 | −1.657 | 40 | 0.000 | −5.369 | −39.615 | 0.000 |
| 16 | 0.000 | −6.700 | −18.000 | −1.629 | 41 | 0.000 | −5.323 | −41.538 | 0.000 |
| 17 | 0.000 | −6.700 | −18.000 | −1.600 | 42 | 0.000 | −5.277 | −43.461 | 0.000 |
| 18 | 0.000 | −6.700 | −18.444 | −1.467 | 43 | 0.000 | −5.231 | −45.384 | 0.000 |
| 19 | 0.000 | −6.700 | −18.889 | −1.333 | 44 | 0.000 | −5.185 | −47.307 | 0.000 |
| 20 | 0.000 | −6.700 | −19.333 | −1.200 | 45 | 0.000 | −5.139 | −49.230 | 0.000 |
| 21 | 0.000 | −6.700 | −19.778 | −1.067 | 46 | 0.000 | −5.092 | −51.153 | 0.000 |
| 22 | 0.000 | −6.700 | −20.222 | −0.933 | 47 | 0.000 | −5.046 | −53.076 | 0.000 |
| 23 | 0.000 | −6.700 | −20.667 | −0.800 | 48 | 0.000 | −5.000 | −54.999 | 0.000 |
| 24 | 0.000 | −6.700 | −21.111 | −0.667 | 49 | 0.000 | −5.000 | −55.000 | 0.000 |
| 25 | 0.000 | −6.700 | −21.556 | −0.533 | 50 | 0.000 | −5.000 | −55.000 | 0.000 |

TABLE III

Allocation Lookup Table

| Required SNR (dB) | Quantizing Levels |
|---|---|
| 0.00 | 0 |
| 8.21 | 3 |
| 11.62 | 5 |
| 15.09 | 7 |
| 21.49 | 15 |
| 27.75 | 31 |
| 34.01 | 64 |
| 39.99 | 128 |
| 46.16 | 256 |
| 52.12 | 512 |
| 58.19 | 1,024 |
| 64.14 | 2,048 |
| 70.11 | 4,096 |
| 76.23 | 8,192 |
| 82.21 | 16,384 |
| 88.11 | 32,768 |
| 94.32 | 65,536 |

TABLE IV

Threshold Adjustment

| | | | | Subbands x | | | |
|---|---|---|---|---|---|---|---|
| S(x) | 0 | 6 | 0 | 6 | 18 | 30 | 30 | 36 |
| Δ(x) | — | 6 | −6 | 6 | 12 | 12 | 0 | 6 |
| e(x) | 0 | 0 | 0 | 0 | −6 | −6 | 0 | 0 |

TABLE V

Threshold Adjustment

| | | | | Subbands x | | | |
|---|---|---|---|---|---|---|---|
| S(x) | 0 | 6 | 0 | 6 | 18 | 30 | 42 | 36 |
| Δ(x) | — | 6 | −6 | 6 | 12 | 12 | 12 | −6 |
| e(x) | 0 | 0 | 0 | 0 | −12 | −12 | −12 | 0 |

TABLE VI

Threshold Adjustment

| | | | | Subbands x | | | |
|---|---|---|---|---|---|---|---|
| S(x) | 0 | 6 | 0 | 6 | 18 | 30 | 36 | 36 |
| Δ(x) | — | 6 | −6 | 6 | 12 | 12 | 6 | 0 |
| e(x) | 0 | 0 | 0 | 0 | −6 | −6 | −6 | 0 |

TABLE VII

Threshold Adjustment

| | | | | Subbands x | | | |
|---|---|---|---|---|---|---|---|
| S(x) | 0 | 6 | 0 | 6 | 18 | 30 | 42 | 48 |
| Δ(x) | — | 6 | −6 | 6 | 12 | 12 | 12 | 6 |
| e(x) | 0 | 0 | 0 | 0 | −12 | −12 | −12 | −12 |

I claim:

1. An encoding method for constructing an encoded representation of an input signal for decoding by a decoding method that comprises applying a plurality of synthesis filters, said encoding method comprising generating subband signals by applying a plurality of analysis filters to said input signal;

producing, in response to said subband signals, encoded information having lower informational requirements than said subband signals, wherein said lower information requirements are achieved using a masking threshold established according to psycho-perceptual principles and by allowing for spectral distortions introduced by said decoding method, said allowing for spectral distortions being responsive to rate of rolloff of said masking threshold and rate of rolloff of frequency response of said plurality of synthesis filters; and assembling said encoded information into said encoded representation.

2. An encoding method according to claim 1 wherein said plurality of analysis filters is implemented by one or more digital transforms.

3. An encoding method according to claim 1 wherein said allowing for said spectral distortions comprises establishing allocation values in accordance with said psycho-perceptual principles;

establishing a noise spectrum in accordance with said allocation values;

estimating perceptual effects of decoding spectral distortion by generating a decoding distortion spectrum in response to said noise spectrum; and adjusting said allocation values in response to said estimated perceptual effects of said decoding spectral distortion.

4. An encoding method according to claim 3 wherein said estimating perceptual effects comprises generating said decoding distortion spectrum by convolving said noise spectrum with a respective frequency response of a respective one of said plurality of synthesis filters; and estimating said perceptual effects by establishing which if any portions of said decoding distortion spectrum exceeds said masking threshold.

5. An encoding method according to claim 4 wherein said adjusting comprises selecting noise spectrum components which are large contributors to portions of said decoding distortion spectrum exceeding said masking threshold, and adjusting allocation values of encoded information corresponding to said selected noise spectrum components.

6. An encoding method according to claim 5 wherein said selecting noise spectrum components comprises weighting said noise spectrum with a frequency-reversed representation of said respective frequency response centered about each subband in which said decoding distortion spectrum exceeds said masking threshold;

generating a weighted noise spectrum by summing the results of said weighting for each noise spectrum component; and selecting noise spectrum components corresponding to large weighted noise spectrum components.

7. An encoding method according to claim 1 wherein said allowing for spectral distortions comprises estimating a spectral envelope of said input signal;

comparing said spectral envelope with said rate of rolloff of frequency response;

identifying one or more portions of said spectral envelope which change at a rate substantially equal to or greater than said rate of rolloff of frequency response; and increasing information requirements of selected encoded information corresponding to said one or more portions of spectral envelope.

8. An encoding method according to claim 7 wherein information requirements of said selected encoded information is increased by reducing one or more portions of said masking threshold.

9. An encoding method according to claim 7 wherein information requirements of encoded information at frequencies above said one or more portions of spectral envelope are increased by an amount that decreases with increasing frequency.

10. An apparatus for constructing an encoded representation of an input signal for decoding by a decoder that comprises applying a plurality of synthesis filters, said apparatus comprising means for generating subband signals by applying a plurality of analysis filters to said input signal;

means for producing, in response to said subband signals, encoded information having lower informational requirements than said subband signals, said means for producing encoded information comprising means for achieving said lower information requirements using a masking threshold established according to psycho-perceptual principles; and means, responsive to rate of rolloff of said masking threshold and rate of rolloff of frequency response of said plurality of synthesis filters, for allowing for spectral distortions introduced by said decoder; and means for assembling said encoded information into said encoded representation.

11. An apparatus according to claim 10 wherein said plurality of analysis filters is implemented by one or more digital transforms.

12. An apparatus according to claim 10 wherein said means for allowing for said spectral distortions comprises means for establishing allocation values in accordance with said psycho-perceptual principles;

means for establishing a noise spectrum in accordance with said allocation values;

means for estimating perceptual effects of decoding spectral distortion by generating a decoding distortion spectrum in response to said noise spectrum; and means for adjusting said allocation values in response to said estimated perceptual effects of said decoding spectral distortion.

13. An apparatus according to claim 12 wherein said means for estimating perceptual effects comprises means for generating said decoding distortion spectrum by convolving said noise spectrum with a respective frequency response of a respective one of said plurality of synthesis filters; and means for estimating said perceptual effects by establishing which if any portions of said decoding distortion spectrum exceeds said masking threshold.

14. An apparatus according to claim 13 wherein said means for adjusting comprises means for selecting noise spectrum components which are large contributors to portions of said decoding distortion spectrum exceeding said masking threshold; and wherein allocation values of encoded information corresponding to said selected noise spectrum components are adjusted.

15. An apparatus according to claim 14 wherein said means for selecting noise spectrum components comprises means for weighting said noise spectrum with a frequency-reversed representation of said respective frequency response centered about each subband in which said decoding distortion spectrum exceeds said masking threshold;

means for generating a weighted noise spectrum by summing the results of said weighting for each noise spectrum component; and means for selecting noise spectrum components corresponding to large weighted noise spectrum components.

16. An apparatus according to claim 10 wherein said means for allowing for spectral distortions comprises means for estimating a spectral envelope of said input signal;

means for comparing said spectral envelope with said rate of rolloff of frequency response;

means for identifying one or more portions of said spectral envelope which change at a rate substantially equal to or greater than said rate of rolloff of frequency response; and means for increasing information requirements of selected encoded information corresponding to said portions of spectral envelope.

17. An apparatus according to claim 16 wherein information requirements of said selected encoded information is increased by reducing one or more portions of said masking threshold.

18. An apparatus according to claim 16 wherein information requirements of encoded information at frequencies above said one or more portions of spectral envelope are increase by an amount that decreases with increasing frequency.

19. An apparatus for decoding an encoded representation of an input signal, said decoder comprising means for extracting quantized subband information from said encoded representation;

allocation means for establishing allocation values by using a masking threshold established according to psycho-perceptual principles and by allowing for spectral distortions introduced by a plurality of synthesis filters, said allowing for spectral distortions being responsive to rate of rolloff of said masking threshold and rate of rolloff of frequency response of said plurality of synthesis filters;

means for generating dequantized subband information by dequantizing said quantized subband information in accordance with said allocation values; and means for generating an output signal by applying said plurality of synthesis filters to said dequantized subband information.

20. An apparatus according to claim 19 wherein said allocation means comprises means for establishing allocation values in accordance with said psycho-perceptual principles;

means for establishing a noise spectrum in accordance with said allocation values;

means for estimating perceptual effects of decoding spectral distortion by generating a decoding distortion spectrum in response to said noise spectrum; and means for adjusting said allocation values in response to said estimated perceptual effects of said decoding spectral distortion.

21. An apparatus according to claim 20 wherein said means for estimating perceptual effects comprises means for generating said decoding distortion spectrum by convolving said noise spectrum with a respective frequency response of a respective one of said plurality of synthesis filters; and means for estimating said perceptual effects by establishing which if any portions of said decoding distortion spectrum exceeds said masking threshold.

22. An apparatus according to claim 19 wherein said allocation means comprises means for estimating a spectral envelope of said input signal;

means for comparing said spectral envelope with said rate of rolloff of frequency response;

means for identifying one or more portions of spectral envelope which change at a rate substantially equal to or greater than said rate of rolloff of frequency response; and means for increasing information requirements of selected encoded information corresponding to said portions of spectral envelope.

23. An apparatus according to claim 22 wherein information requirements of said selected encoded information is increased by reducing one or more portions of said masking threshold.

24. An apparatus according to claim 22 wherein information requirements of encoded information at frequencies above said one or more portions of spectral envelope are increased by an amount that decreases with increasing frequency.

* * * * *

UNITED STATES PATENT AND TRADEMARK OFFICE
CERTIFICATE OF CORRECTION

PATENT NO. : 5,623,577
DATED : April 22, 1997
INVENTOR(S) : Louis D. Fielder

It is certified that error appears in the above-identified patent and that said Letters Patent is hereby corrected as shown below:

<u>Column 16,</u>
Line 30, $$"F_i(x) = a_i(x) \cdot S(x) + b_i(x) \cdot F_i(x-1) + [1 - b_i(x)] \sum_{i=1}^{R_i(x)} S(x)"$$

Should be $$"F_i(x) = a_i(x) \cdot S(x) + b_i(x) \cdot F_i(x-1) + [1 - b_i(x)] \sum_{j=1}^{R_i(x)} a_i(x-j) \cdot S(x-j)"$$

As it appears on page 1 of the Request for Entry of Amendment after Allowance dated October 17, 1996 and entered in Response to Rule 312 Communication dated January 31, 1997

<u>Column 5,</u>
Line 19, "Co)" should be -- (b)--.

<u>Column 16,</u>
Line 8, insert -- S(x) -- after "$F_1(x)=a_1(x)$"

<u>Column 29,</u>
Line 13, insert ¶ before the sentence beginning with "If line …" to indicate a new paragraph.

Signed and Sealed this

Eighteenth Day of September, 2001

Attest:

NICHOLAS P. GODICI
*Attesting Officer*      *Acting Director of the United States Patent and Trademark Office*